US011724606B2

(12) United States Patent
Fan et al.

(10) Patent No.: US 11,724,606 B2
(45) Date of Patent: Aug. 15, 2023

(54) BATTERY PACK

(71) Applicants: CPS Technology Holdings LLC, New York, NY (US); Clarios Advanced Solutions GmbH, Hannover (DE)

(72) Inventors: Binbin Fan, Shanghai (CN); Liang Cheng, Shanghai (CN); Wei Qu, Shanghai (CN); Peng Song, Shanghai (CN); Yingyao Fu, Shanghai (CN); Chang Liu, Shanghai (CN); Jason D. Fuhr, Sussex, WI (US); Martin Wiegmann, Borstel (DE); Xugang Zhang, Shorewood, WI (US); Jennifer L. Czarnecki, Franklin, WI (US)

(73) Assignees: CPS Technology Holdings LLC, New York, NY (US); Clarios Advanced Solutions GmbH, Hannover (DE)

( * ) Notice: Subject to any disclaimer, the term of this patent is extended or adjusted under 35 U.S.C. 154(b) by 86 days.

(21) Appl. No.: 17/518,179

(22) Filed: Nov. 3, 2021

(65) Prior Publication Data

US 2022/0059893 A1 Feb. 24, 2022

Related U.S. Application Data

(62) Division of application No. 16/348,447, filed as application No. PCT/IB2017/056996 on Nov. 9, 2017, now Pat. No. 11,177,525.

(30) Foreign Application Priority Data

Nov. 9, 2016 (CN) .................. 201610987137.X

(51) Int. Cl.
*B60L 50/64* (2019.01)
*B60L 58/26* (2019.01)
(Continued)

(52) U.S. Cl.
CPC ............ *B60L 50/64* (2019.02); *B60L 58/26* (2019.02); *F04D 25/0673* (2013.01);
(Continued)

(58) Field of Classification Search
CPC ..... H01M 10/625; H01M 10/65–6595; H01M 50/35
See application file for complete search history.

(56) References Cited

U.S. PATENT DOCUMENTS

2007/0037053 A1   2/2007   Anantharaman
2010/0081041 A1   4/2010   Okada et al.
(Continued)

FOREIGN PATENT DOCUMENTS

CN          1192591 A      9/1998
CN       201689923 U      12/2010
(Continued)

OTHER PUBLICATIONS

Machine Translation of DE-102020213987-B3 (Feb. 24, 2023) (Year: 2023).*
(Continued)

*Primary Examiner* — Matthew J Merkling
(74) *Attorney, Agent, or Firm* — Boardman & Clark LLP

(57) ABSTRACT

The present disclosure provides a battery pack for a hybrid vehicle. The battery pack includes: multiple battery cells, a housing, a first end plate, a second end plate, a bearing plate and an upper cover, wherein the housing is provided with a bottom portion and side walls extending from the periphery of the bottom portion and forming an upper portion opening; the housing is configured for accommodating the multiple battery cells and the two end plates, when the multiple battery cells are sequentially arranged and mounted into the housing, the first end plate and the second end plate are located at two end sides of the sequentially arranged mul-
(Continued)

tiple battery cells to laterally fix the multiple battery cells; the bearing plate is mounted above the top portions of the multiple battery cells; and the upper cover is mounted above the housing to cover the upper portion opening of the housing.

26 Claims, 16 Drawing Sheets

(51) Int. Cl.
| | |
|---|---|
| *F04D 25/06* | (2006.01) |
| *F04D 29/60* | (2006.01) |
| *H01M 10/42* | (2006.01) |
| *H01M 50/342* | (2021.01) |
| *H01M 10/48* | (2006.01) |
| *H01M 50/367* | (2021.01) |
| *H01M 50/517* | (2021.01) |
| *H01M 50/507* | (2021.01) |
| *H01M 50/242* | (2021.01) |
| *H01M 50/227* | (2021.01) |
| *H01M 50/296* | (2021.01) |
| *H01M 50/284* | (2021.01) |
| *H01M 50/298* | (2021.01) |
| *H01M 50/271* | (2021.01) |
| *H01M 50/244* | (2021.01) |
| *H01M 50/209* | (2021.01) |
| *H01M 50/51* | (2021.01) |
| *H01M 50/55* | (2021.01) |
| *H01M 50/583* | (2021.01) |
| *H01M 50/553* | (2021.01) |

(52) U.S. Cl.
CPC ........ *F04D 29/601* (2013.01); *H01M 10/425* (2013.01); *H01M 10/482* (2013.01); *H01M 50/209* (2021.01); *H01M 50/227* (2021.01); *H01M 50/242* (2021.01); *H01M 50/244* (2021.01); *H01M 50/271* (2021.01); *H01M 50/284* (2021.01); *H01M 50/296* (2021.01); *H01M 50/298* (2021.01); *H01M 50/342* (2021.01); *H01M 50/367* (2021.01); *H01M 50/507* (2021.01); *H01M 50/51* (2021.01); *H01M 50/517* (2021.01); *H01M 50/55* (2021.01); *H01M 50/553* (2021.01); *H01M 50/583* (2021.01); *H01M 2010/4271* (2013.01); *H01M 2220/20* (2013.01)

(56) References Cited

U.S. PATENT DOCUMENTS

| | | |
|---|---|---|
| 2011/0151311 A1 | 6/2011 | Lee et al. |
| 2012/0264002 A1 | 10/2012 | Osaki |
| 2013/0101883 A1 | 4/2013 | Zhao |
| 2013/0171478 A1 | 7/2013 | Ushijima |
| 2014/0087231 A1 | 3/2014 | Schaefer et al. |
| 2015/0037629 A1 | 2/2015 | Janarthanam et al. |
| 2015/0069829 A1 | 3/2015 | Dulle et al. |
| 2015/0125720 A1 | 5/2015 | Fujii et al. |
| 2015/0295215 A1 | 10/2015 | Nagamine et al. |
| 2015/0333304 A1 | 11/2015 | Sekine |
| 2016/0036088 A1 | 2/2016 | Tononishi |
| 2016/0064702 A1 | 3/2016 | Tyler et al. |
| 2016/0093849 A1 | 3/2016 | Dekeuster et al. |
| 2016/0248061 A1 | 8/2016 | Brambrink |
| 2016/0301058 A1 | 10/2016 | Tyler et al. |
| 2016/0336549 A1 | 11/2016 | Brisbane |
| 2017/0033343 A1 | 2/2017 | Miyawaki |
| 2017/0062783 A1 | 3/2017 | Kim |

FOREIGN PATENT DOCUMENTS

| | | | |
|---|---|---|---|
| CN | 102867932 A | 1/2013 | |
| CN | 202797121 U | 3/2013 | |
| CN | 202977642 U | 6/2013 | |
| CN | 203377271 U | 1/2014 | |
| CN | 104011901 A | 8/2014 | |
| CN | 104081559 A | 10/2014 | |
| CN | 104103781 A | 10/2014 | |
| CN | 104103801 A | 10/2014 | |
| CN | 104124402 A | 10/2014 | |
| CN | 104124406 A | 10/2014 | |
| CN | 102479986 A | 5/2015 | |
| CN | 204424346 U | 6/2015 | |
| CN | 105322122 A | 2/2016 | |
| CN | 105489812 A | 4/2016 | |
| CN | 105518903 A | 4/2016 | |
| CN | 105531845 A | 4/2016 | |
| CN | 113574726 A * | 10/2021 | .......... H01M 50/209 |
| DE | 102008010838 A1 | 8/2009 | |
| DE | 102010038862 A1 | 2/2012 | |
| DE | 102020213987 B3 * | 12/2021 | |
| EP | 1217681 A3 | 6/2002 | |
| EP | 2518792 A1 | 10/2012 | |
| JP | 5128825 B2 | 8/2008 | |
| JP | 2008192342 A | 8/2008 | |
| JP | 2010211950 A | 3/2009 | |
| JP | 2010277735 A | 12/2010 | |
| JP | 2015179618 A | 10/2015 | |
| WO | 2012042913 A1 | 4/2012 | |
| WO | 2016140430 A1 | 9/2016 | |

OTHER PUBLICATIONS

Machine Translation of CN-113574726-A (Feb. 24, 2023) (Year: 2023).*

International Search Report and Written Opinion of the International Search Authority dated Mar. 29, 2018, for PCT/IB2017/056996 filed Nov. 9, 2017.

International Search Report and Written Opinion of the International Search Authority dated Apr. 4, 2018, for PCT/IB2017/056993 filed Nov. 9, 2017.

International Search Report and Written Opinion of the International Search Authority dated Apr. 13, 2018, for PCT/IB2017/056994 filed Nov. 9, 2017.

International Search Report and Written Opinion of the International Search Authority dated Jan. 18, 2018, for PCT/IB2017/056995 filed Nov. 9, 2017.

* cited by examiner

FAN CONTROL CIRCUIT

BATTERY PACK

TECHNICAL FILED

The present disclosure generally relates to a battery pack comprised of a plurality of battery cells, and more particularly to a battery pack comprised of a plurality of serially-connected battery cells for a hybrid vehicle.

BACKGROUND

To improve fuel consumption efficiency, in addition to being powered by a traditional gasoline engine, a hybrid vehicle also needs to use a battery pack comprised of a plurality of serially-connected battery cells as a DC power source providing a certain voltage. For example, by serially connecting 13 battery cells each having a 3.85V DC voltage, a battery pack having a 48V DC voltage may be formed as a DC power source providing the 48V DC voltage.

Constant development of hybrid vehicles sets a higher requirement on the DC power source. For example, newly designed hybrid vehicles are equipped with some parts that require a larger driving current, including an electric air-conditioner, an electronic charger (E-charge), an electric turbocharger, and an electric power steering, etc. Moreover, the newly designed hybrid vehicles have higher requirements on boost, start-stop, and battery recuperation. In addition, the newly designed hybrid vehicles require that the DC power source can save fuel consumption to a greater extent (about 15%) and further reduce gas emissions (especially $CO_2$ emissions).

The newly design hybrid vehicles' high requirements above on the DC power source make battery pack design more difficult. Further, despite of their higher requirements on the DC power source, the new-design hybrid vehicles require no increase in its volume and size; despite of an increased current output, a superb anti-overheat performance is required. These requirements make it even more difficult to design the battery pack.

The existing DC power sources often cannot meet the higher requirements of the newly designed hybrid vehicles on the DC power source. Therefore, there is a need to provide a battery pack as a DC power source in a hybrid vehicle, the structure of which is adapted to the higher requirements on the DC power source of the new-design hybrid vehicle.

SUMMARY OF THE INVENTION

A series of simplified concepts are introduced in the Summary section, which will be described further in detail in the Detailed Description of The Invention section. The Summary of the present disclosure is not intended to limit key features and essential technical features of the technical solutions as claimed, let alone defining the protection scope thereof.

To overcome the deficiencies in the prior art, the present disclosure provides a battery pack for a hybrid vehicle. The battery pack is provided with several battery cells each of which has a top portion and a bottom portion, the top portion of each of the several battery cells being provided with a battery cell cathode and a battery cell anode. The battery pack is characterized by comprising:

a housing having a bottom portion, a first length side wall and a second length side wall that are oppositely disposed and extend upwardly along a length direction of the bottom portion, and a first width side wall and a second width side wall that are oppositely disposed and extend upwardly along a width direction of the bottom portion, wherein the bottom portion, the first length side wall, the second length side wall, the first width side wall and the second width side wall form the housing closed by the bottom portion and the four sides with an upper portion opening;

several oppositely disposed guide ribs, which are provided on inner sides of the first and second length side walls to form several cellular slots for mounting the several battery cells;

a first end plate and a second end plate, wherein when the several battery cells are sequentially arrayed and mounted into the several cellular slots, the first end plate and the second end plate are disposed at two end sides of the several sequentially arrayed battery cells to laterally secure the several sequentially arrayed battery cells;

a bearing plate mounted on the top portions of the several battery cells; and an upper cover mounted on the upper portion of the housing to cover the upper portion opening of the housing.

The battery pack as described above is characterized in that:

the bearing plate secures the several sequentially arrayed and mounted battery cells in a vertical direction of the housing.

The battery pack as described above is characterized in that:

the bottom portion is provided with a heat dissipation apparatus, the heat dissipation apparatus being provided with an air passage that has an inlet and an outlet.

The battery pack as described above is characterized in that:

the heat dissipation apparatus is provided with a heat dissipation pad, two sides of the heat dissipation pad being in contact with the bottom portions of the several battery cells and the upper portion of the air passage, respectively.

The battery pack as described above is characterized by further comprising:

a circuit board on which a control circuit is mounted;

a harness borne on the bearing plate, the harness including several wires, the several wires being arranged for connecting each of the several battery cells to the control circuit.

The battery pack as described above is characterized in that:

the battery cell cathode and the battery cell anode of each of the several battery cells are protrudingly disposed at the top portion of each battery cell;

several windows are provided on the bearing plate; and the battery pack further comprises:

several battery cell bus bars mounted in the several windows of the bearing plate to serially connect the cathode and the anode of each of the several battery cells to form a cathode output end and an anode output end of the serially connected battery cells; and several battery cell fasteners arranged for connecting the several battery cell bus bars to the battery cell cathodes and/or battery cell anodes of the respective battery cells.

The battery pack as described above is characterized in that:

one end of each of the several wires on the harness is mounted to one corresponding bus bar of the several battery cell bus bars, for connecting the battery cell cathode and/or battery cell anode of the corresponding battery cell; and the other end of each of the several wires on the harness is connected to the control circuit, such that the battery cell cathode and the battery cell anode of each of the several battery cells are connected to the control circuit to enable the control circuit to monitor a working state of each of the battery cells.

The battery pack as described above is characterized by further comprising:

a first metal wiring terminal and a second metal wiring terminal, the first metal wiring terminal and the second metal wiring terminal being connected to the cathode output end and the anode output end of the several serially connected battery cells, respectively; and a first step and a second step provided at two end portions of the first length side wall;

wherein the first metal wiring terminal and the second metal wiring terminal are disposed on the first step and the second step, respectively.

The battery pack as described above is characterized in that:

the first step and the second step are disposed at a position of the first length side wall adjacent to the upper portion opening.

The battery pack as described above is characterized in that:

at respective junctions of the two end portions of the first length side wall with the first width side wall and the second width side wall, the first length side wall is bent at two end portions thereof towards a direction of the second length side wall, and two end portions of the first width side wall and the second width side wall adjacent to the first length side wall are bent towards each other respectively, such that the first step and the second step are formed at the two junctions of the first length side wall with the end portions of the first width side wall and the second width side wall.

The battery pack as described above is characterized in that:

a middle recessed portion is formed between the protruding battery cell cathode and battery cell anode disposed at the top portion of each of the several battery cells, at least one seal-breakable opening is provided on a surface of the middle recessed portion, the at least one seal-breakable opening being arranged for discharging a gas generated in the battery cells when broken;

when the several battery cells are successively arrayed and mounted into the housing, a battery top portion through-slot is formed in the several middle recessed portions of the several top portions of the several battery cells; and the bottom portion of the bearing plate has a bearing plate bottom portion through-slot, and a distal end of the bearing plate bottom portion through-slot is provided with a blocking plate, such that when the bearing plate is mounted on the top portion of the several battery cells, the bearing plate bottom portion through-slot is press-fitted with the battery cell top portion through-slot to form a lateral gas discharging passage, the lateral gas discharging passage having an outlet, and a distal end of the lateral gas discharging passage being blocked by the blocking plate.

The battery pack as described above is characterized in that:

the housing has a vertical gas discharging passage, the vertical gas discharging passage being disposed on an inner side of the first width side wall;

a gas discharging port is provided on the first width side wall; and the vertical gas discharging passage is in fluid communication with the lateral gas discharging passage.

The battery pack as described above is characterized in that:

an upper end of the first end plate is provided with a ventilation guide slot, the ventilation guide slot being disposed between the lateral gas discharging passage and the vertical gas discharging passage to fluidly connecting the lateral gas discharging passage with the vertical gas discharging passage.

The battery pack as described above is characterized in that:

a material for bearing the first metal wiring terminal and the second metal wiring terminal is a first plastic material;

other portions of the housing are made of a second plastic material or most of the housing are made of the second plastic material, The battery pack as described above is characterized in that:

the first plastic material and the second plastic material have different characteristics;

the first plastic material has good insulation and anti-corrosion performance; and the second plastic material has good mechanical performance.

The battery pack as described above is characterized in that:

the first plastic material is polyphthalamide; and the second plastic material is Nylon 66.

The battery pack as described above is characterized by further comprising:

a first metal sheet and a second metal sheet, first ends of the first metal sheet and the second metal sheet being provided with the first metal wiring terminal and the second metal wiring terminal, respectively;

a first leading-out terminal and a second leading-out terminal, which are provided at second ends of the first metal sheet and the second metal sheet, respectively, such that the first metal wiring terminal and the second metal wiring terminal are electrically conducted with the first leading-out terminal and the second leading-out terminal, respectively;

wherein the first leading-out terminal and the second leading-out terminal are connected to the cathode output end and the anode output end of the several serially connected battery cells, respectively.

The battery pack as described above is characterized by further comprising:

a first plastic substrate and a second plastic substrate made of the first plastic material; wherein before molding the housing, the first metal sheet and the second metal sheet are prefabricated;

before molding the housing, the first metal sheet and the second metal sheet are insert-molded in the plastic substrate made of the first plastic material; and when the housing is molded using the second plastic material, the first and second plastic substrates are insert-molded into the first step and the second step on the housing, respectively.

The battery pack as described above is characterized in that:

first ends of the first metal sheet and the second metal sheet are disposed outside the housing; and second ends of the first metal sheet and the second metal sheet are disposed inside the housing.

The battery pack as described above is characterized in that:

the first end plate and the second end plate are made of a plastic material to absorb expansion and deformation of the several battery cells when the expansion and deformation occur.

The battery pack as described above is characterized in that:
front faces of the first end plate and the second end plate contact with outermost two battery cells of the several sequentially arrayed battery cells respectively to secure the several sequentially arrayed battery cells in a horizontal direction; and
a circuit board and/or an electronic component are mounted at reverse faces of the first end plate and the second end plate.

The battery pack as described above is characterized in that:
a control circuit is provided on the circuit board;
the electronic components include a relay;
the circuit board is mounted on the reverse face of the first end plate; and
the relay is mounted on the reverse face of the second end plate.

The battery pack as described above is characterized in that:
a relay plugin is provided on the relay;
a plugin corresponding to the relay is provided on the circuit board; and
the relay plugin is pluggable onto the plugin on the circuit board corresponding to the relay.

The battery pack as described above is characterized in that:
several reinforcing ribs are provided on the front faces of the first end plate and the second end plate to support the several battery cells and buffer a pressure against two ends of the battery pack generated by expansion of the several battery cells.

The battery pack as described above is characterized by further comprising:
a fan assembly mounted at an outlet of the air passage, wherein
the fan assembly is conveniently disassemblable from outside the housing as required in use.

The battery pack as described above is characterized in that the fan assembly comprises:
1 a fan mounting base plate having a proximal end and a distal end;
a fan mounting bracket disposed at the distal end of the fan mounting base plate; and
a fan mounted on the fan mounting bracket; wherein
a width of the proximal end of the fan mounting base plate is greater than a width of the distal end of the fan mounting base plate, such that a trapezoid transition edge is formed between the width of the proximal end of the fan mounting base plate and the width of the distal end of the fan mounting base plate;
a width of the fan mounting bracket is smaller than the width of the distal end of the fan mounting base plate; and
the width of the proximal end of the fan mounting base plate is adapted to the housing.

The battery pack as described above is characterized in that the housing comprises:
a fan assembly side wall opening that is disposed outside the second width side wall;
a fan assembly mounting accommodation cavity that is in fluid connection with the fan assembly side wall opening and extends into the housing;
a bottom portion opening provided at a part of the bottom portion of the housing corresponding to the fan assembly mounting accommodation cavity, a shape of the bottom portion opening being adapted to a shape of the fan mounting base plate; wherein
the fan assembly, the fan assembly side wall opening, the fan assembly mounting accommodation cavity, and the bottom opening of the housing are designed in such a way that the fan assembly may be inserted into the fan assembly mounting accommodation cavity from the bottom opening of the housing to enable the proximal end of the fan mounting base plate to be substantially overlapped with an edge of the bottom portion of the housing, and to enable the fan mounting base plate to cover the bottom opening of the housing.

The battery pack as described above is characterized in that:
a pair of distal end mounting holes are provided on the distal end of the fan mounting base plate, and a pair of proximal end mounting holes are provided on the proximal end of the fan mounting base plate;
a pair of mounting holes are provided at the bottom portion of the fin assembly side wall opening, such that the fan assembly may be secured to the bottom portion of the fin assembly side wall opening through the pair of distal end mounting holes on the fan mounting base plate using bottom portion fasteners;
at an overlapping part between the proximal end of the fan mounting base plate and the bottom portion of the housing, a corresponding pair of mounting holes are provided at the bottom portion of the housing, such that the fan assembly may be secured to the bottom portion of the housing through the pair of proximal end mounting holes on the fan mounting base plate using the bottom portion fasteners.

The battery pack as described above is characterized in that:
a fan assembly plugin is provided on the fan assembly;
a corresponding fan assembly plugin is provided on the circuit board; and
when the fan assembly is inserted into the fan assembly mounting accommodation cavity, the fan assembly plugin may be electrically inserted onto the corresponding fan assembly plugin on the circuit board.

The battery pack as described above is characterized in that:
when the bottom portion fasteners are disassembled and the fan assembly plugin is disengaged from the corresponding fan assembly plugin on the circuit board, the fan assembly may be drawn out downwardly from the bottom opening of the housing.

The battery pack as described above is characterized in that:
an upper portion of the fan assembly has an upper portion edge formed by the fan mounting bracket and the fan, the upper portion edge having a thickness;
a first blocking portion and a second blocking portion are provided inside the fan assembly mounting accommodation cavity, an interval with a thickness larger than that of the upper portion edge being provided between the first blocking portion and the second blocking portion; and
when the fan assembly is mounted in the fan mounting accommodation cavity, the upper portion edge is stuck between the first blocking portion and the second blocking portion, thereby limiting a movement of the fan assembly in a horizontal direction relative to the housing.

The battery pack provided by the present disclosure far use in a micro-hybrid vehicle enhances fuel efficiency and reduces exhaust emissions, particularly $CO_2$ gas emissions. As hybrid vehicles increasingly use some components with a larger power, e.g., an electric air-conditioner, an electric turbocharger, and an electric power steering, etc., a battery that may provide a larger power is needed. The 48V 10 Ah battery pack provided by the present disclosure can enable a traditional hybrid vehicle to save about 15% fuel, and to have a compact structure and a small size.

BRIEF DESCRIPTION OF THE DRAWINGS

These and other features and advantages of the present disclosure may be better understood by reading through Detailed Description below with reference to the drawings. Throughout the drawings, identical reference numerals represent identical components, wherein.

DETAILED DESCRIPTION OF THE INVENTION

Figure 1A:
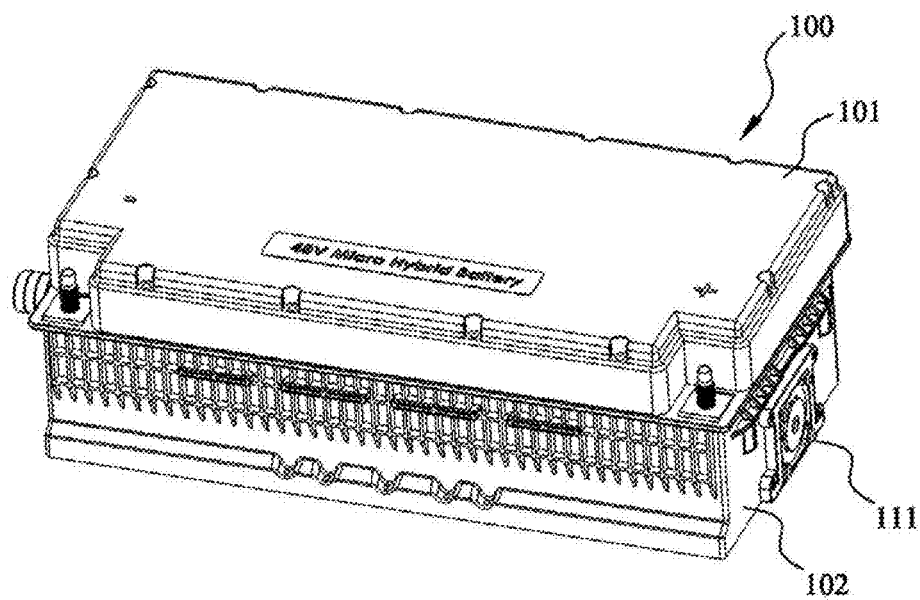
FIG. 1A is a schematic diagram of a battery pack according to the present disclosure, in which a fan is mounted.

Hereinafter, various specific embodiments of the present disclosure will be described with reference to the accompanying drawings which constitute part of the specification. It should be noted that although terms indicating directions, such as "front," "back," "up," "down," "left," "right," and other directional or orientational words, are used herein to describe various exemplary structural parts and elements of the present disclosure, these terms are used herein only for the convenience of description, which are determined based on the exemplary orientations shown in the drawings. Because the examples disclosed in the present disclosure may be arranged in different directions, these directional terms are only used for illustration purpose and should not be regarded as limiting. In the accompanying drawings below, identical or similar reference numerals are used to indicate identical or similar components.

Figure 1B:
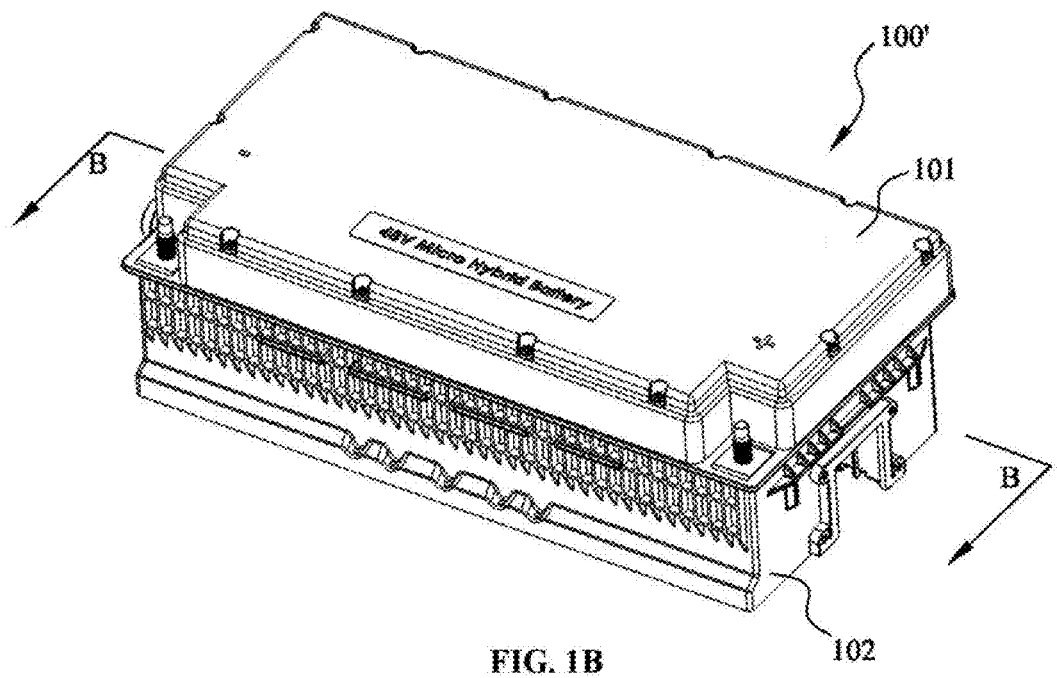
FIG. 1B is a schematic diagram of a battery pack without mounting a fan according to the present disclosure.

Both FIG. 1A and FIG. 1B show a battery pack according to the present disclosure. The battery pack is mainly used for a hybrid vehicle. As shown in FIGS. 1A and 1B, the battery pack 100 comprises an upper cover 101 and a housing 102, the upper cover 101 covering the housing 102 to form the battery pack 100 that is closed to the outside. The battery pack 100 may optionally have a fan assembly 111 mounted on the housing 102, wherein FIG. 1A shows a battery pack 100 mounted with a fan, and FIG. 1B shows a battery pack 100' without mounting a fan, to adapt to different users' demands.

Figure 1C:
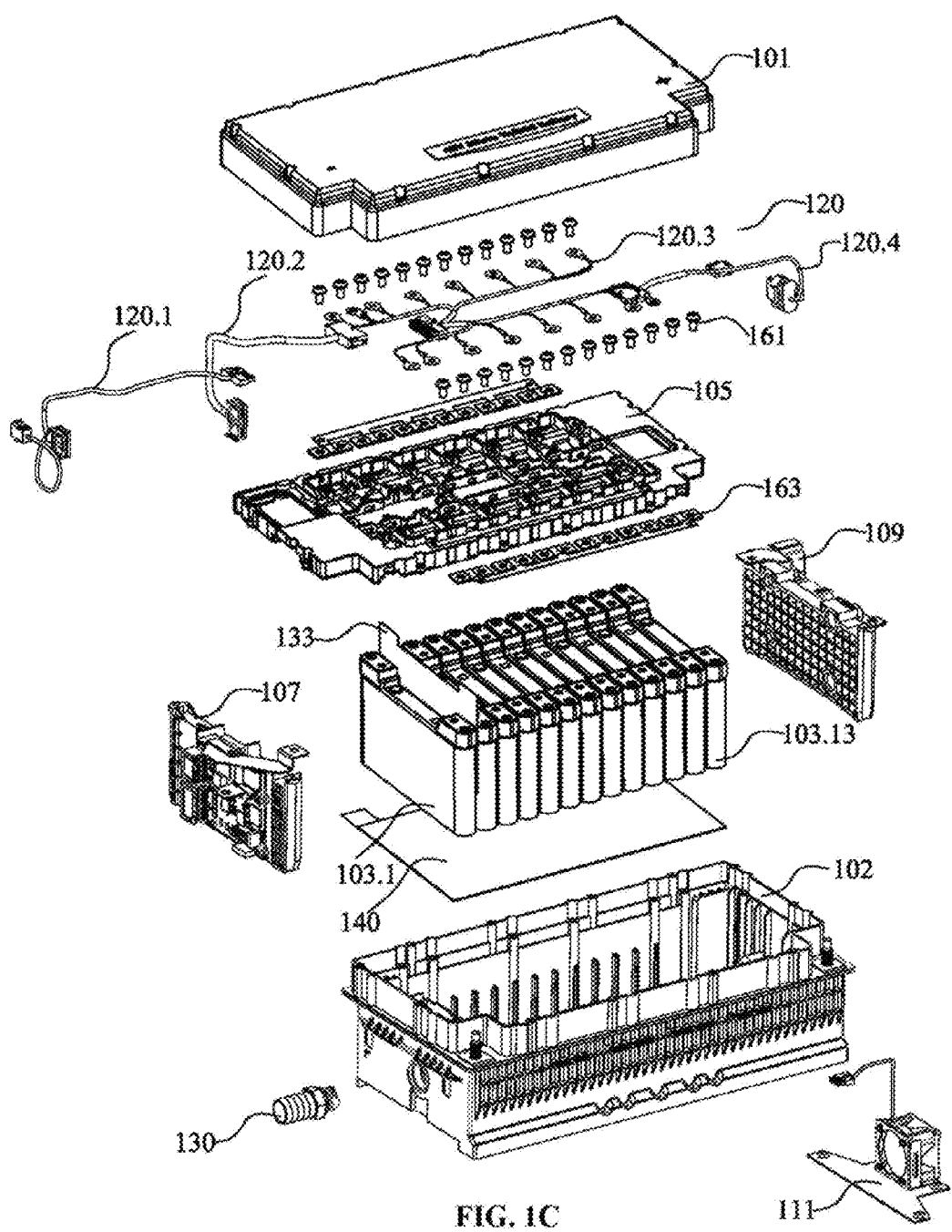
FIG. 1C is an exploded schematic view of the battery pack in FIG. 1A.

FIG. 1C shows an exploded schematic view of the battery pack 100 in FIG. 1A. As shown in FIG. 1C, in addition to the upper cover 101 and the housing 102, the battery pack 100 further comprises several battery cells 103, a bearing plate 105, a first end plate 107, a second end plate 109, and a harness 120. The several battery cells 103 are sequentially arrayed and mounted in the housing 102. The first end plate 107 and the second end plate 109 are disposed at two end sides of the several mounted battery cells 103, respectively, to laterally secure the several mounted battery cells 103. The bearing plate 105 is disposed above the several mounted battery cells 103, and the harness 120 is borne by the bearing plate 105. As shown in FIGS. 1A and 1B, the battery pack 100 may optionally further comprise a fan assembly 111. In addition, a gas discharging nozzle 130 is also mounted on a side wall of the housing 102. A partition plate 133 is provided between every two adjacent battery cells 103, to partition off two adjacent battery cells 103. A heat dissipation pad is provided beneath the several battery cells 103, to conduct out heat generated by the several battery cells 103. The battery pack 100 further comprises several battery cell bus bars 163 that are secured on the cathodes and anodes of the battery cells 103 through battery cell fasteners 161, thereby serially connecting two adjacent battery cells 103. The harness 120 has a harness first segment 120.1, a harness second segment 120.2, a harness third segment 120.3, and a harness fourth segment 120.4, the functions of which will be detailed infra.

Figure 2A:
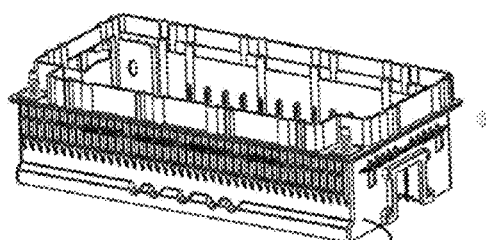
FIGS. 2A-F are schematic diagrams of the mounting process of the battery pack shown in FIG. 1A.
Figure 2B:
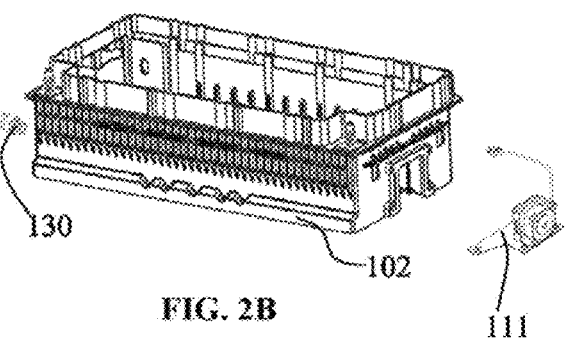
Figure 2C:
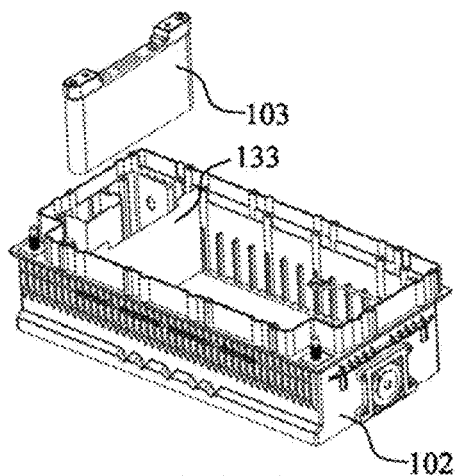
Figure 2D:
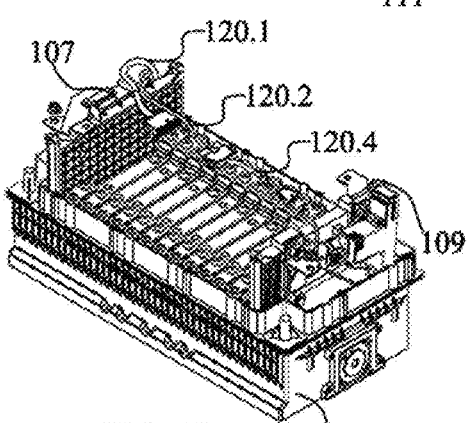
Figure 2E:
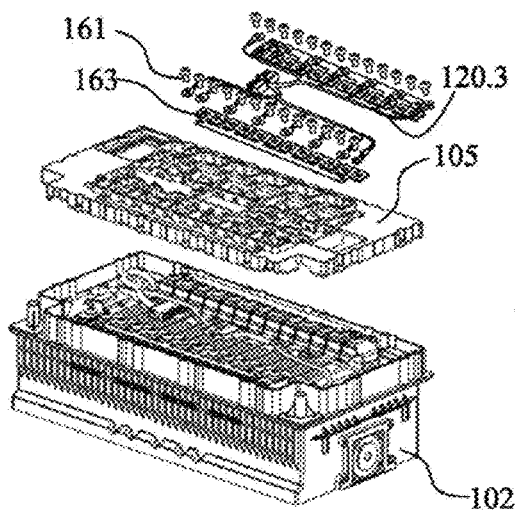
Figure 2F:
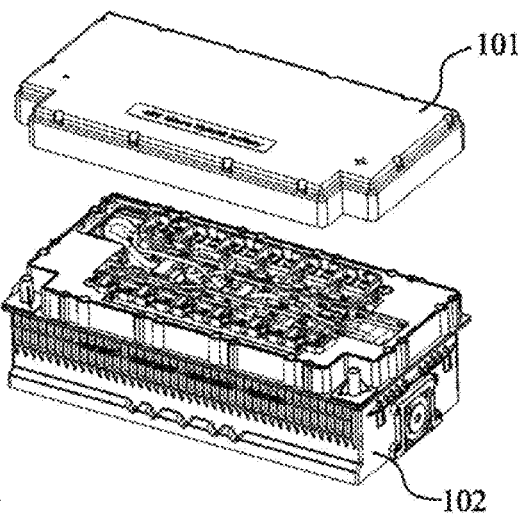

Hereinafter, a mounting process of the battery pack in FIG. 1 will be introduced in detail with reference to FIGS. 2A-F. First, as shown in FIGS. 2A and 2B, the gas discharging nozzle 130 and the fan assembly 111 are mounted to corresponding positions of the housing 102, respectively. Then, as shown in FIG. 2C, the several battery cells 103 are inserted into the housing 102 one by one, such that a polarity of each battery cell 103 is disposed to be opposite to the polarity of an adjacent battery cell, and the partition plate 133 is inserted between adjacent battery cells 103. Afterwards, as shown in FIG. 2D, the first end plate 107 and the second end plate 109 are inserted into the battery housing 102, respectively, such that they are disposed at two sides of the several sequentially arrayed battery cells 103, respectively. However, before inserting the first end plate 107 and the second end plate 109 into the battery housing 102, one end of the harness first segment 120.1 and one end of the harness second segment 120.2 are connected to the first end plate 107, respectively; one branch wire of one end of the harness fourth segment 120.4 (this end of the fourth segment 120.4 has two branch wires); the other branch thereof is connected to the fan assembly 111; then, the other end of the harness first segment 120.1 is connected to the other end of the harness fourth segment 120.4. Next, as shown in FIG. 2E, the several battery cell bus bars 163 are first disposed at corresponding positions on the bearing plate 105; then the bearing plate 105 is disposed on the housing 102; thereafter, the harness third segment 120.3 and the battery cell bus bars 163 are secured onto the electrodes of the battery cells 103 via the battery cell fasteners 163, one end of the harness third segment 120.3 is connected to the harness second segment 120.2, and the bearing plate 105 is secured onto the housing 102 through fasteners. In this way, the bearing plate 105 is disposed above the several battery cells 103 and the two end plates (107, 109) in the housing. Finally, as shown in FIG. 2F, the upper cover 101 is secured onto the housing 102 of the battery pack to finish mounting the battery pack 100.

Hereinafter, specific structures of various components of the battery pack 100 will be introduced in detail.

Figure 3:
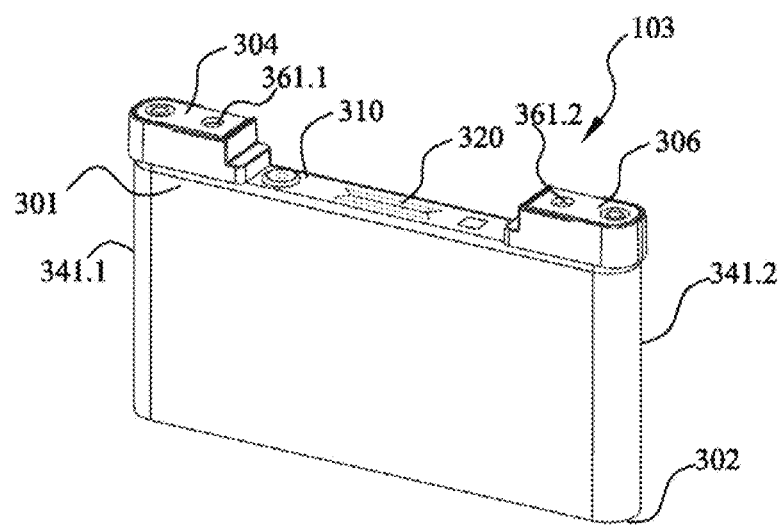
FIG. 3 is a stereoscopic view of a battery cell in a battery pack according to the present disclosure.

First, a battery cell 103 in the battery pack of the present disclosure will be introduced with reference to FIG. 3. As shown in FIG. 3, the battery cell 103 is of a substantially flat cuboid shape. The battery cell 103 has a top portion 301 and a bottom portion 302 in an up-down direction; the battery cell 103 is inserted into the housing 102 from the bottom portion 302. The battery cell 103 further has a battery cell first end portion 341.1 and a battery cell second end portion 341.2 in a left-right direction. The top portion 301 of the battery cell 103 is provided with a battery cell cathode 304 and a battery cell anode 306, the battery cell cathode 304 and the battery cell anode 306 being proximal to the battery cell first end portion 341.1 and the battery cell second end portion 341.2, respectively, and the battery cell cathode 304 and the battery cell anode 306 being protrudingly provided thereby to form a battery cell recessed portion 310 in a middle of the top portion 301 of the battery cell 103. A seal-breakable opening 320 is provided on the battery cell recessed portion 310; when the battery cell 103 is in a normal working state, the seal-breakable opening 320 is in a. sealed state; when an extreme circumstance occurs to the battery cell 103, the seal-breakable opening 320 is broken to release the high-temperature gas inside the battery cell, thereby releasing the pressure inside the battery cell to avoid risks. A hole 361.1, 361.2 is provided on the battery cell cathode 304 and the battery cell anode 306, respectively, to mount the battery cell fasteners 161.

Figure 4A:
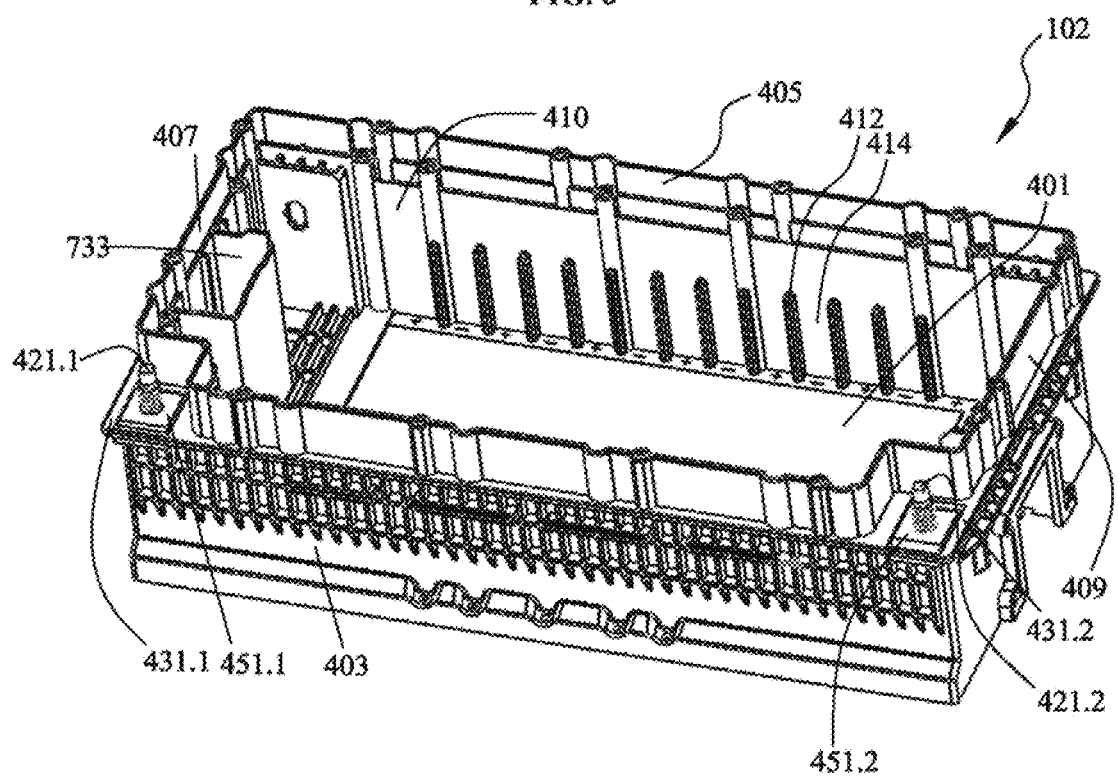
FIG. 4A is a stereoscopic schematic view of a housing of a battery pack according to the present disclosure.
Figure 4B:
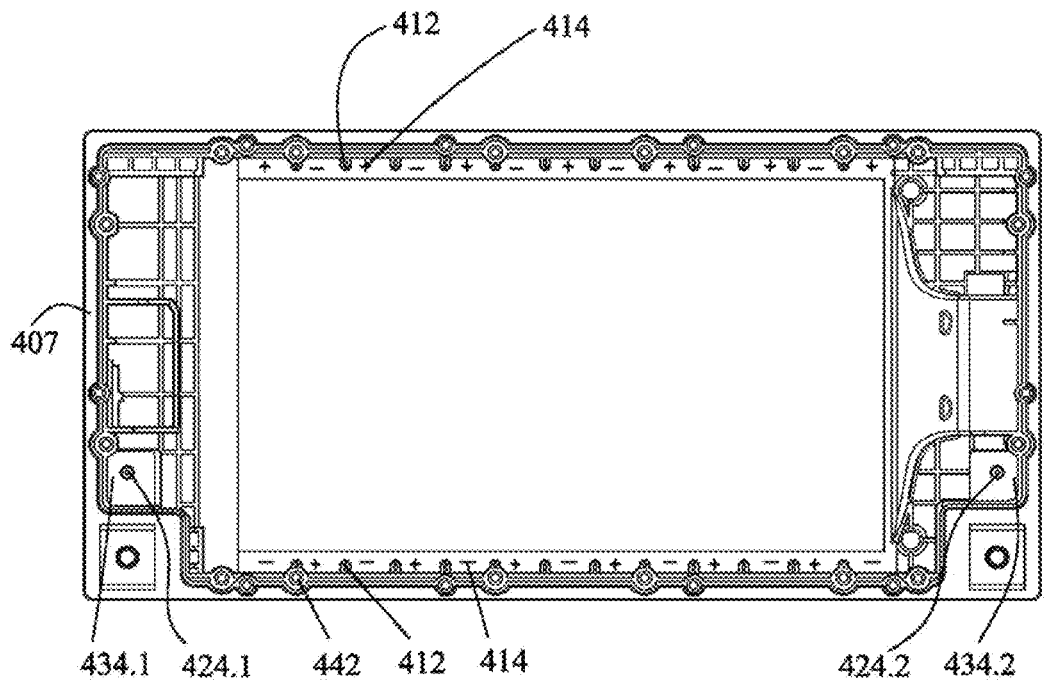
FIG. 4B is a top schematic view of the housing of the battery pack according to the present disclosure.

FIGS. 4A and 4B show a housing of a battery pack of the present disclosure, wherein FIG. 4A is a stereoscopic schematic view of the housing, and FIG. 4B is a top view of the housing. As shown in FIG. 4A, the housing 102 has a bottom portion 401, a first length side wall 403 and a second length side all 405 being disposed oppositely and extending upwards along the length direction of the bottom portion 401, and a first width side wall 407 and a second width side wall 409 being disposed oppositely and extending upwards along the width direction of the bottom portion 401. The bottom portion 401, the first length side wall 403, the second length side wall 405, the first width side wall 407, and the second width side wall 409 together form the housing 103 closed at the bottom portion and the four sides with an upper portion opening 410 from which the battery cell 103, the first end plate 107 and the second end plate 109 may be inserted into the housing 102. Several guide ribs are provided on the inner sides of the first length side wall 403 and the second length side wall 405 of the housing 102, wherein the guide ribs 412 on the first length side wall 403 and the guide ribs 412 on the second length side wall 405 are oppositely provided; a cellular slot 414 is formed between adjacent two guide ribs 412 on each length side wall, the cellular slot 414 facilitating mounting the battery cell 103.

With reference to FIG. 4B, FIG. 4B shows more clearly the guide ribs 412 and the cellular slots 414 on the first length side wall 403 and the second length side wall 405. Each battery cell 103 is inserted into a pair of oppositely disposed cellular slots 414 provided on the first length side wall 403 and the second length side wall 405, respectively, to enable the first end portion 341.1 and the second end portion 341.2 of the battery cell to be stuck into the oppositely disposed cellular slots 414, respectively, such that after the battery cell 103 is inserted into the housing 102, the guide rib 412 may limit a horizontal movement of the battery cell 103 along the length direction of the housing 102, thereby enabling each battery cell 103 to be securely disposed in the housing 102. The housing 102 is provided with several mounting holes 442 for fitting with corresponding mounting holes on the bearing plate 105, such that the bearing plate 105 may be secured on the housing 102 through fasteners.

Still shown in FIG. 4A, at two junctions between the two end portions of the first length side wall 403 and the first width side wall 407 and the second width side wall 409, the first length side wall 403 is bent at two end portions thereof towards a direction of the second length side wall 405, and two end portions of the first width side wall 407 and the second width side wall 409 adjacent to the first length side wall 403 are bent towards each other respectively, so as to form the first step 431.1 and the second step 431.2 at two junctions between the first length side wall 403 and the end portions of the first width side wall 407 and the second width side wall 409. The first step 431.1 and the second step 431.2 are provided at a position of the first length side wall 403 adjacent to the upper opening 410. A first metal wiring terminal 421.1 is provided on the first step 431.1, and a second metal wiring terminal 421.2 is provided on the second step 431.2, the first metal wiring terminal 421.1 and the second metal wiring terminal 421.2 being used for connecting external loads of the battery pack 100.

Figure 5A:
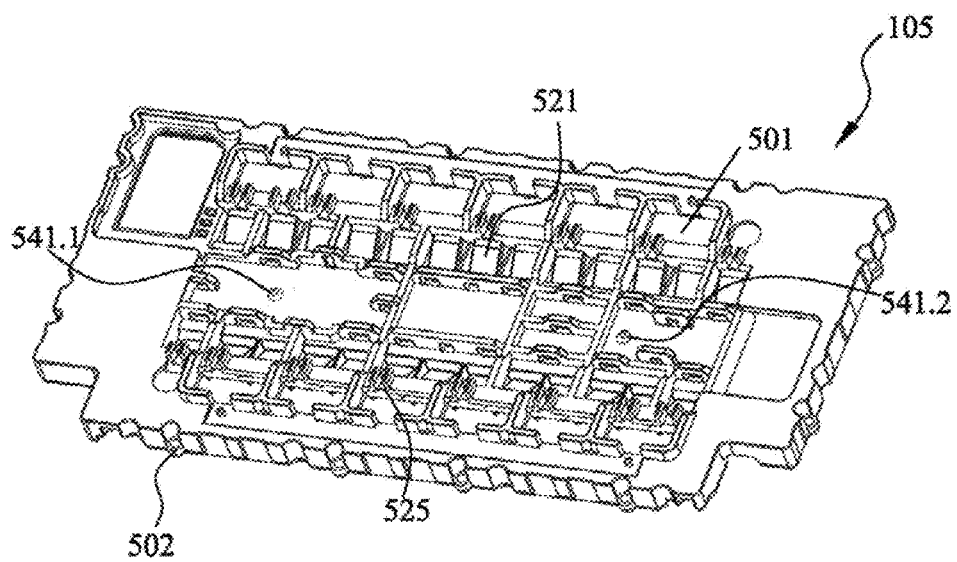
FIG. 5A is a stereoscopic schematic view of a bearing plate of a battery pack according to the present disclosure.
Figure 5B:
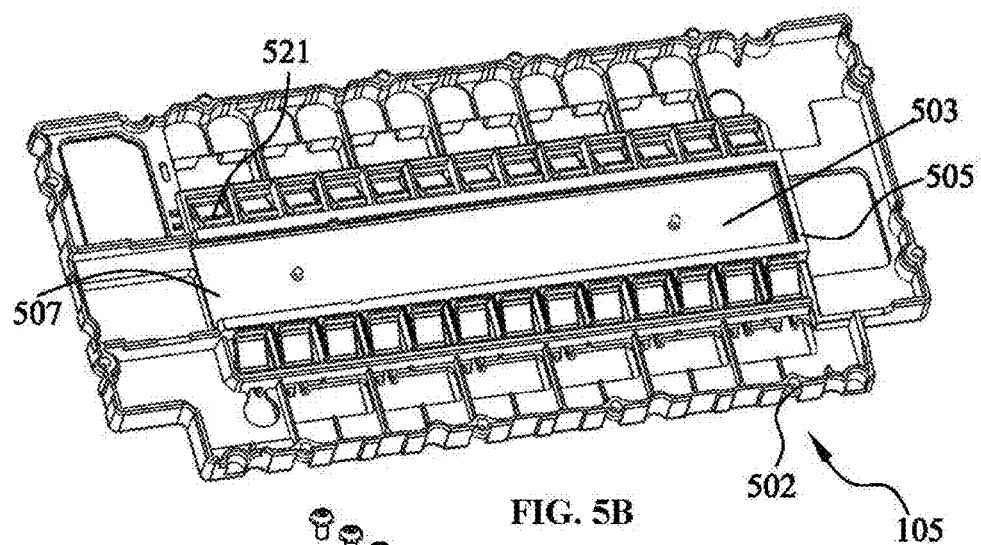
FIG. 5B is a stereoscopic schematic view from another perspective of the bearing plate in FIG. 5A.

FIG. 5A and FIG. 5B show stereoscopic views from two different perspectives of the bearing plate of the battery pack of the present disclosure, wherein FIG. 5A shows a top portion of the bearing plate, while FIG. 5B shows a bottom portion of the bearing plate. As shown in FIGS. 5A and 5B, several windows 501 through the bearing plate are provided on the bearing plate 105, the several windows 501 being arranged for accommodating several battery cell bus bars 163, respectively. A bottom portion of the bearing plate 105 has a bearing plate bottom portion through-slot 503, and a distal end of the bearing plate bottom portion through-slot 503 is provided with a blocking plate 505. A metal sheet 507 is mounted at a slot bottom of the bearing plate bottom portion through-slot 503; the metal sheet 507 is secured through bolts (541.1, 541.2). Several springs 521 pivotally connected with the bearing plate are provided at both sides of the bearing plate bottom portion through-slot 503, respectively; the several springs 521 are disposed such that when the bearing plate 105 is mounted on the housing 102, the several springs 521 are located above the cathodes and anodes of the several battery cells 103, respectively. One side of the spring 521 proximal to the bearing plate bottom portion through-slot 503 is connected to the bearing plate 105, such that one side of the spring 521 distal to the bearing plate bottom portion through-slot 503 may pivotally move. When the bearing plate 105 is mounted onto the housing 102 from above the battery cell 103, the spring 521 presses tightly against the cathode and anode of each battery cell 103 through a pivotal movement. A top portion of the bearing plate 105 is further provided with several clamps 525 for securing the harness 120. Several mounting holes 502 are provided at a periphery of the bearing plate 105, for fitting with several mounting holes 442 on the housing 102, so that the bearing plate 105 may be fixed onto the housing 102 through fasteners.

Figure 6:
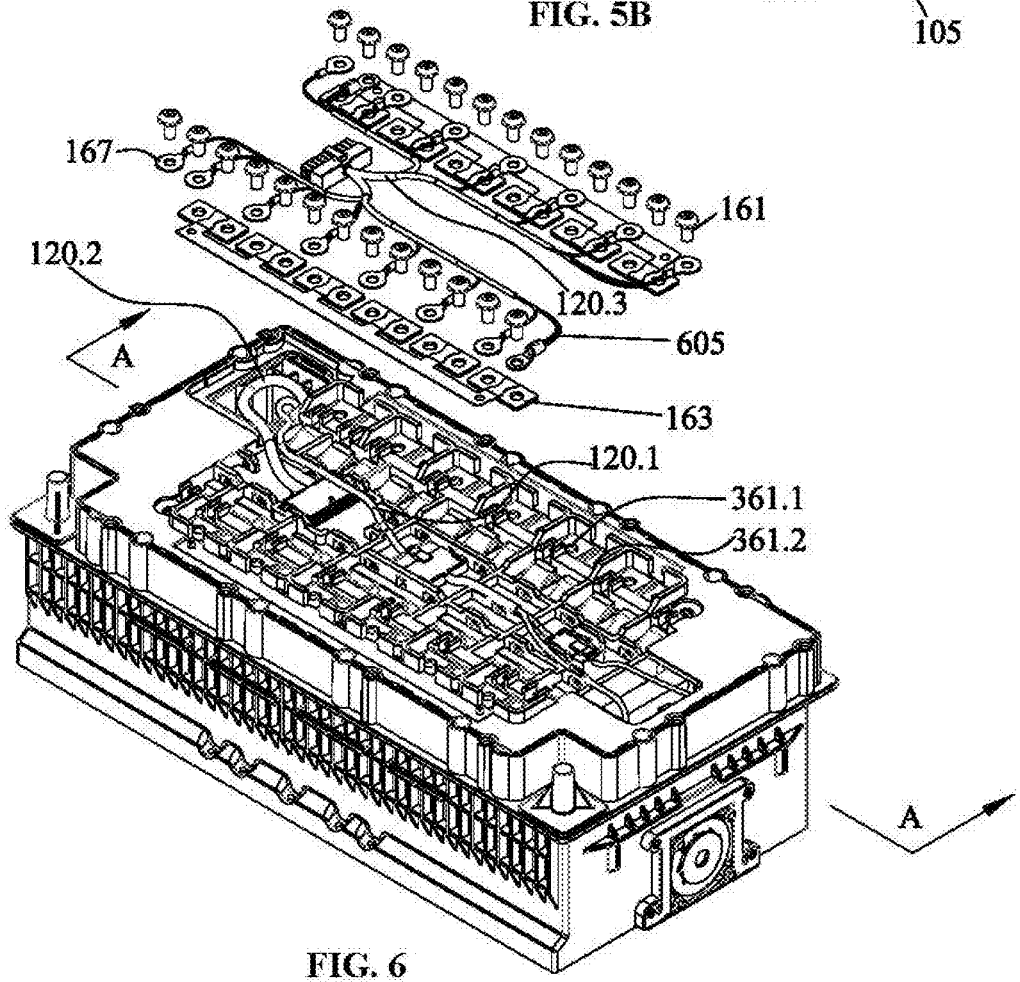
FIG. 6 is an exploded schematic view of part of components of a battery pack according to the present disclosure, showing that the battery cells and the bearing plate are mounted in the housing, while a harness, battery cell bus bars, and battery cell fastener are disassembled.

FIG. 6 is an exploded schematic view of part of components of the battery pack according to the present disclosure, showing that the battery cells and the bearing plate are mounted in the housing, while a harness, battery cell bus bars, and a battery cell fastener are disassembled. As shown in FIG. 6, among several windows 501 on a beating plate 105, each window 501 exactly faces a cathode and an anode of two adjacent battery cells. In other words, a cathode of a battery cell and an anode of a battery cell adjacent thereto may be seen through each window 501. As mentioned above, the battery cell cathode 304 and the battery cell anode 306 of each battery cell have a hole 361.1 and 361.2, respectively; therefore, the hole 361.1 on one battery cell cathode 304 and the hole 361.2 on one battery cell anode 306 may be seen through each window 501. A battery cell bus bar 163 is mounted in each window 501. Each battery cell bus bar 163 has two bus bar holes, aligned with the hole 361.1 on the battery cell cathode 304 and the hole 361.2 on the battery cell anode 306 in the window 501 where they are mounted, respectively, such that the battery cell fastener 161 may enter the hole 361.1 on the battery cell cathode 304 and the hole 361.2 on the battery cell anode 306 through the bus bar hole, thereby securing the battery cell bus bar 163 onto the battery cell 103 to enable a serial connection of adjacent battery cells 103. The several battery cells connected in series form a cathode output end and an anode output end, which will be detailed infra.

As still shown in FIG. 6, the harness 120 comprises a harness third segment 120.3 having several wires 605, and one end of each of the several wires 605 has a terminal 607 with a terminal hole. Before securing the battery cell bus bar 163 onto the battery cell 103 via the battery cell fastener 161, the terminals 607 of the several wires 605 should be placed on the battery cell bus bar 163, to align the terminal hole with the bus bar hole so that the battery cell fastener 161 may also pass through the terminal hole to connect the terminal 607 to the cathode and anode of the battery cell 103. The other ends of the several wires 605 are connected to the control circuit 1501 via the harness second segment 120.2 (see FIG. 15), such that the control circuit 1501 may acquire the current and voltage between respective battery cells 103, thereby monitoring the working state of respective battery cells 103.

Figure 7:
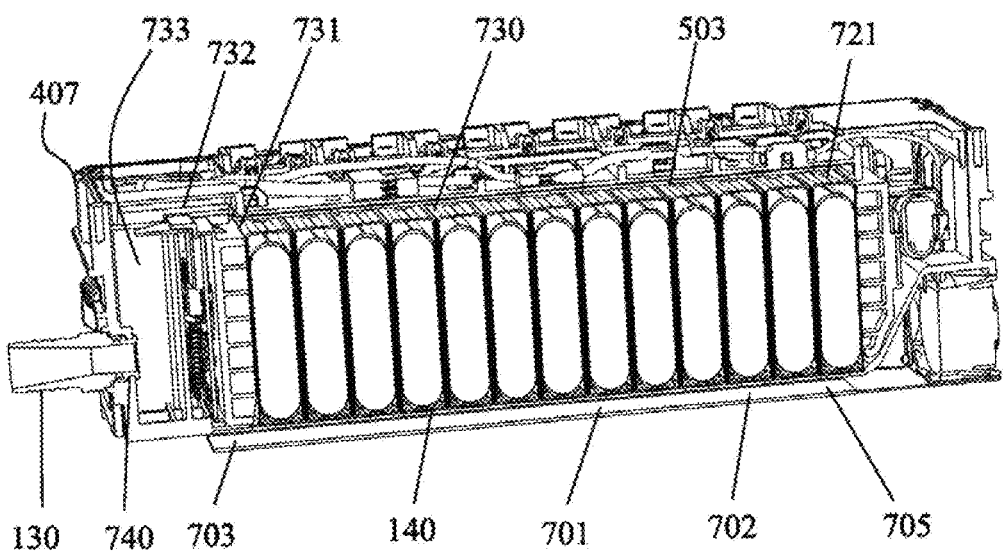
FIG. 7 is a sectional schematic view along A-A sectional line in FIG. 6.

FIG. 7 is a sectional schematic view along the A-A line of FIG. 6. FIG. 7 shows a gas discharging passage of a battery pack according to the present disclosure. As shown in FIG. 7, when several battery cells 103 are successively arrayed and mounted into the housing 102, several middle recessed portions 310 of the several battery cells 103 form a battery top portion through-slot 721. Because the bottom portion of the bearing plate 105 has a bearing plate bottom portion through-slot 503, when the bearing plate 105 is mounted above the top portions 310 of the several battery cells 103, the bottom portion through-slot 503 of the bearing plate 105 is press-fitted with the battery cell top portion through-slot 721, forming a lateral gas discharging passage 730. A distal end (i.e., the right end in FIG. 7) of the lateral gas discharging passage 730 is closed, while the other end of the lateral gas discharging passage 730 has an outlet 731. In one embodiment of the present disclosure, the closed end of the lateral gas discharging passage 730 is sealed by a distal end blocking plate 505 of the bottom portion through-slot 503 of the bearing plate 105. However, it should be noted that in another embodiment, one end of the lateral gas discharging passage 730 may also be sealed by a blocking plate disposed on an adjacent end plate.

Still referring to FIG. 7, the housing 102 has a vertical gas discharging passage 733, the vertical gas discharging passage 733 being provided at an inner side of the first length side wall 407 of the housing 102 and being in fluid communication with the lateral gas discharging passage 731. A gas discharging port 740 is provided on the first length side wall 407, and a gas discharging nozzle 130 may be mounted on the gas discharging port 740 to discharge the gas in the battery pack 100. The connection between the vertical gas discharging passage 733 and the lateral gas discharging passage 731 is implemented via a middle gas discharging passage 732. The middle gas discharging passage 732 is formed jointly by the first end plate 107 and the bearing plate 103 adjacent to the vertical gas discharging passage 733. The specific structure of the middle gas discharging passage 732 will be detailed infra when introducing the first end plate 107 shown in FIGS. 9A-9C.

When an extreme circumstance occurs to the battery pack such that an inner pressure of the battery cell 103 exceeds a tolerance value of the battery cell 103, the seal-breakable opening 320 of the battery cell 103 will be broken so that a gas or a gas-liquid mixture doped with some liquid may be released out of the battery cell 103, and the gas or gas-liquid mixture may flow from the lateral gas discharging passage 730 towards the vertical gas discharging passage 733 via the middle gas discharging passage 732 and then be discharged outside of the battery pack 100 via the gas discharging nozzle 130 mounted on the gas discharging port 740, thereby avoiding risks. Because the top portion (i.e., the slot bottom of the bearing plate bottom portion through-slot 503) of the lateral gas discharging passage 730 is provided with a metal base plate 507, a material of the metal base plate 507, which has a better thermostability than that of the material of the bearing plate 105, may endure the high-temperature gas or gas-liquid mixture released from the battery cell seal-breakable opening 320.

In the present disclosure, the lateral gas discharging passage 730, the vertical gas discharging passage 733, and the middle gas discharging passage 732 of the battery pack 100 are all formed by using the built-in structures of the structural parts of the battery pack, e.g., the battery cells 103, the first end plate 107, the bearing plate 105, and the housing 102, without a need of additionally separately manufacturing a gas discharging passage. In this way, the battery pack may be more easily assembled and has a more compact structure with a reduced manufacturing cost.

Figure 8A:
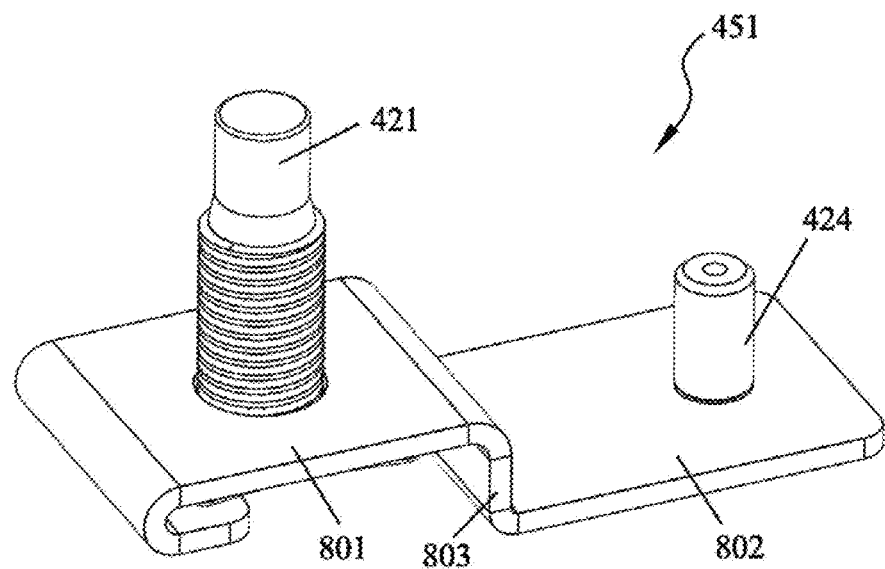
FIG. 8A is a stereoscopic schematic view of a metal sheet in a battery pack of the present disclosure.
Figure 8B:
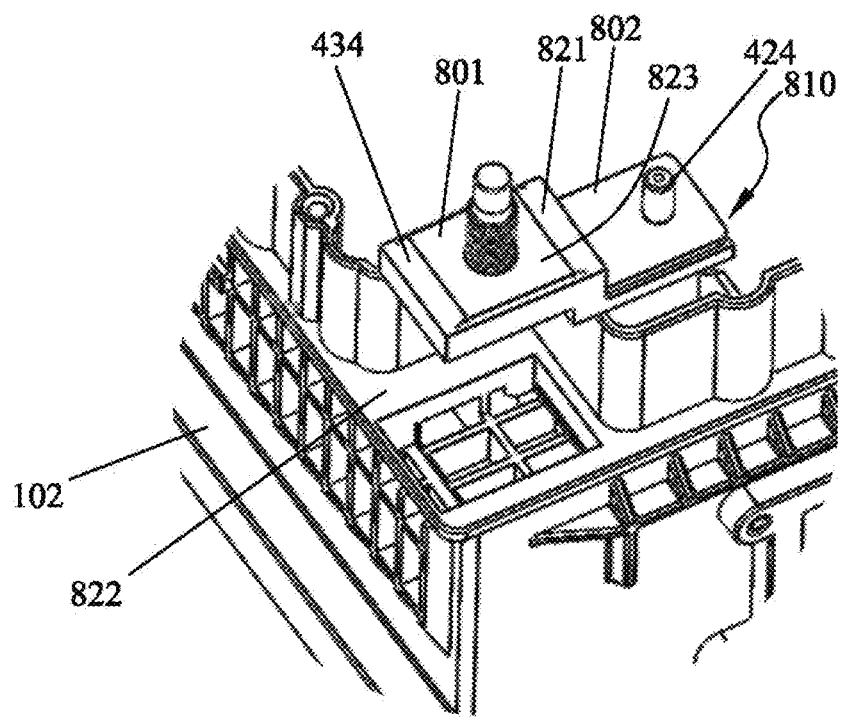
FIG. 8B is an exploded schematic view of a prefabricated assembly and a housing in a battery pack of the present disclosure.
Figure 8C:
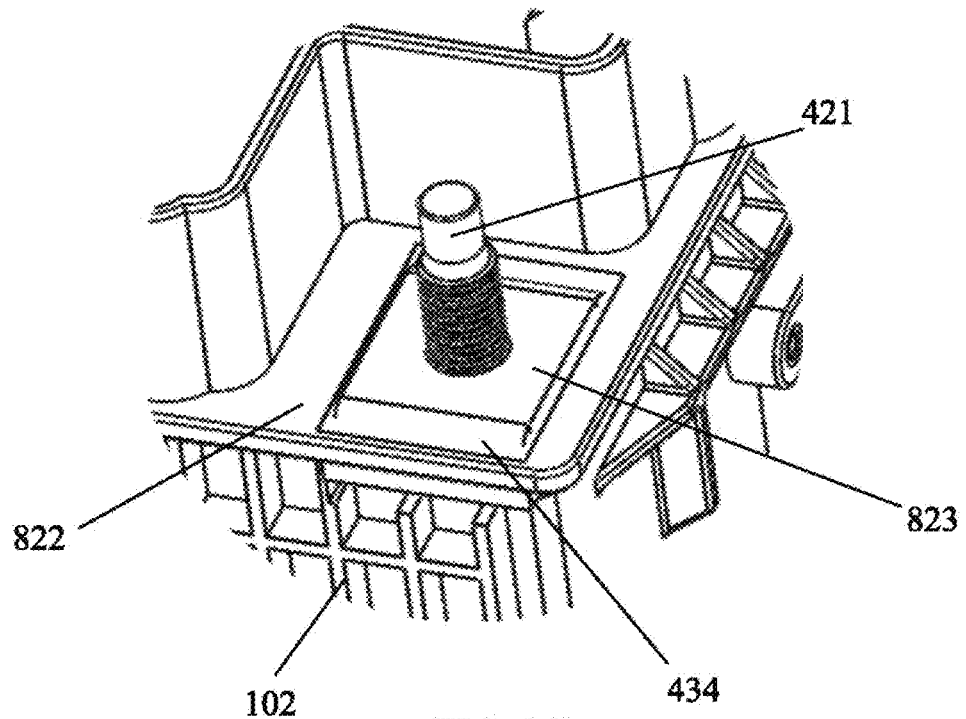
FIG. 8C is a partial enlarged view of a battery pack of the present disclosure, which shows that the prefabricated assembly is embedded in the housing.

FIGS. 8A, 8B, and 8C show a metal sheet in the battery pack of the present disclosure, wherein FIG. 8A is a stereoscopic schematic view of the metal sheet, FIG. 8B is an exploded schematic view of a prefabricated assembly molded by a metal sheet and a first plastic, and a housing, and FIG. 8C is a partial enlarged schematic view of the housing mounted with the prefabricated assembly. Generally, the metal sheet functions to lead the cathode and anode output ends of the several serially connected battery cells from the inside of the battery pack housing to the outside, thereby facilitating a connection between the battery pack and an external load. As shown in FIG. 8A, the metal sheet 451 has a first end 801 and a second end 802 that are connected via a middle portion 803. A plane of the first end 801, a plane of the second end 802, and the middle portion 803 are integrally formed pieces, wherein the plane of the first end 801 is higher than the plane of the second end 802. An outer side of the first end 801 is bent inwardly to limit a rotation of the components mounted at a bottom face of the first end 801 relative to the plane of the first end 801. The first end 801 is mounted with a metal wiring terminal 421, and the second end 802 is mounted with a leading-out terminal 424. The metal wiring terminal 421 is electrically conducted with the leading-out terminal 424, wherein the metal wiring terminal 421 is arranged for connection with the external load, and the leading-out terminal 424 is in electrically conductive connection with the several serially connected battery cells 103 inside the battery pack 100.

Hereinafter, referring to FIG. 8B, the metal sheet 451 is mounted onto the step 431 of the housing 102 of the battery pack 102 in an insert-molded manner. Specifically, the metal sheet 451 is a prefabricated component, by embedding the prefabricated metal sheet 452 into the first plastic material 821 to prepare the prefabricated assembly 810 by molding, and then embedding the prefabricated assembly 810 into the housing 102. For the prefabricated assembly 810 shown in FIG. 8B, the first plastics 821 forms a plastic substrate 434 surrounding the metal sheet 451. The first plastic material 821 has good insulation and anti-corrosion performance. The housing 102 is made of a second plastic material 822, or most of the housing 102 is made of the second plastic material; the second plastic material 822 has good mechanical performance. According to an embodiment of the present disclosure, the first plastics may be Polyphthalamide, and the second plastics may be Nylon 66. However, those skilled in the art should understand that the first plastics and the second plastics adopting other materials having the performance above are also within the protection scope of the present disclosure. During a process of using the battery pack 100, the metal wiring terminal 421 will generate heat due to existence of the external load, and meanwhile it is susceptible to a redox reaction; therefore, it is relatively high demanding on the insulation, thermostability and anti-corrosion performance of the plastic material surrounding the metal wiring terminal 421; accordingly, the demand on the material surrounding the metal wiring terminal 421 may be satisfied by selecting the first plastic material to form the plastic substrate 434 surrounding the metal wiring terminal 421. The reason for the battery pack housing 102 adopting the second plastic material, is that the battery pack housing 102 needs to protect internal parts of the battery pack; therefore, the housing 102 needs a higher strength and hardness. Accordingly, the material of the housing 102 needs to select a material having good mechanical performance. By adopting two different kinds of plastics for the prefabricated assembly 810 and the housing 102, the requirements on the material of the metal wiring terminal 451 and the housing 102 may be simultaneously satisfied.

As illustrated in FIGS. 8A, 8B and 8C, on the first end 801 of the metal sheet 452, the metal wiring terminal 421 is surrounded by a metal surface 823 not cladded by the first plastic material 821, thereby enlarging the electrically conductive contact area when the metal wiring terminal 421 is connected to the external load. The metal surface 823 slightly protrudes above the plane of the plastic substrate 434 formed by the first plastic material 821 (e.g., this may be implemented in the following way: tilting slightly downward the portions adjacent to the two ends of the first end 801 of the metal sheet 452, to enable the plastic substrate 434 to cover the downwardly tilted portions), thereby facilitating the operation of connecting the metal wiring terminal 421 with the external load. On the second end 802 of the metal sheet 452, the leading-out terminal 424 is disposed on the plastic substrate 434 formed by the first material 821. In other words, the first plastic material 821 covers the portion of the second end 802 other than the leading-out terminal 424.

FIG. 8C shows that the prefabricated assembly 810 has been insert-molded in the housing 102. When the housing 102 is molded using the second plastic material, the prefabricated assembly 810 is covered partially by the second plastic and disposed on the step 431 of the housing 102; the plane of the first plastic material surface 821 is substantially flush with the plane of the step 431 of the housing 102.

Figure 9A:
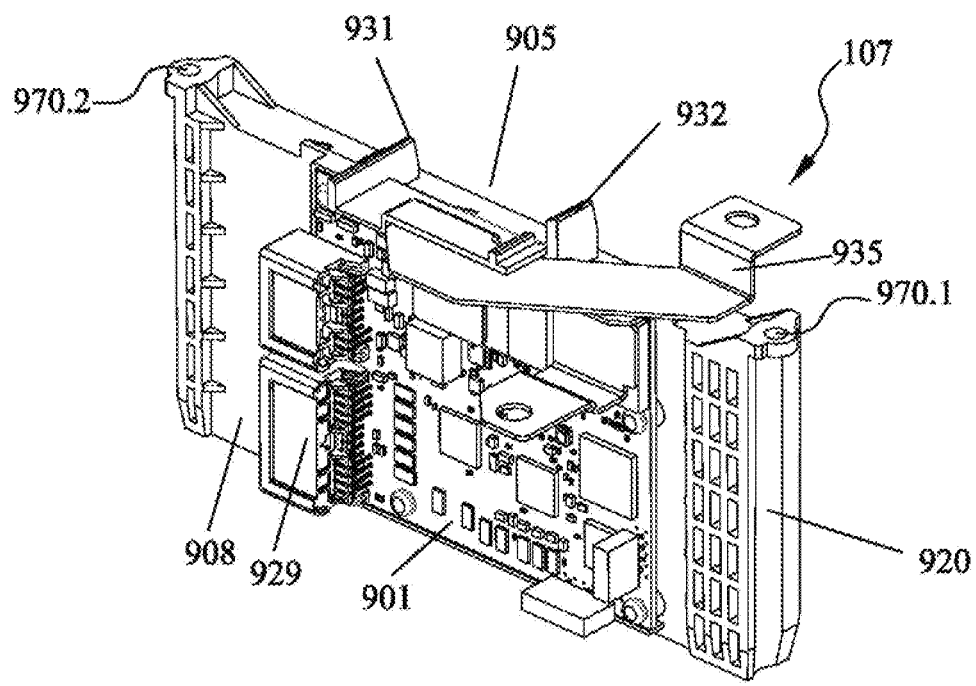
FIG. 9A is a schematic diagram of a reverse face of a first end plate of a battery pack of the present disclosure.
Figure 9B:
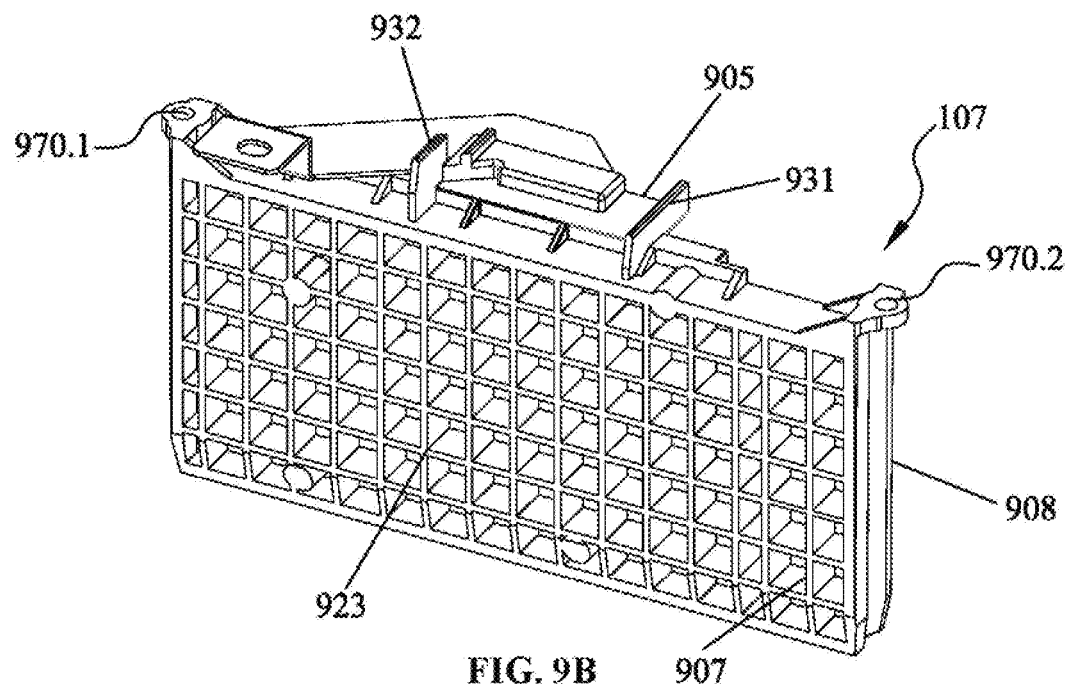
FIG. 9B is a schematic diagram of a front face of the first end plate of the battery pack of the present disclosure.
Figure 9C:
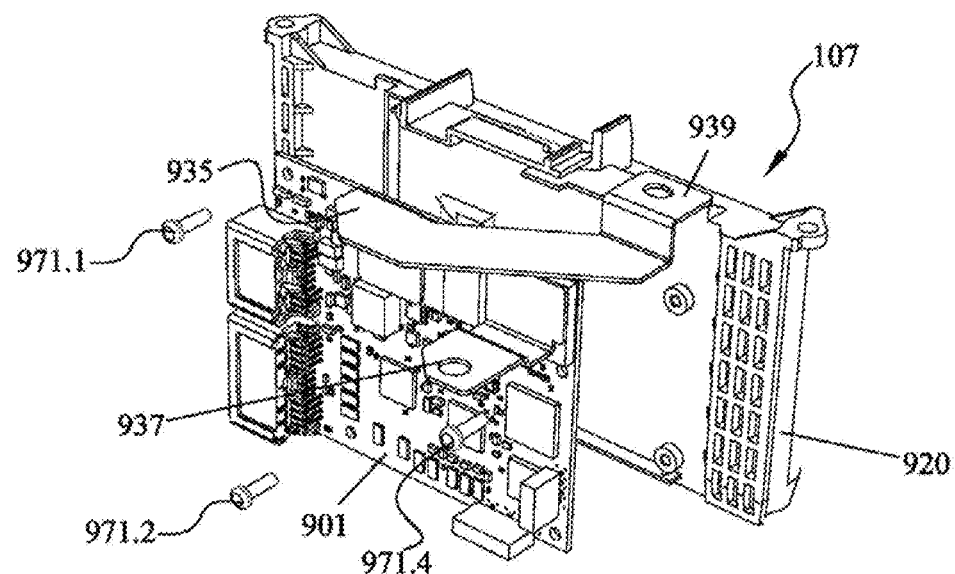
FIG. 9C is an exploded view of the first end plate of the battery pack of the present disclosure.

FIGS. 9A, 9B and 9C show a first end plate of the battery pack of the present disclosure, wherein FIG. 9A shows a reverse face of the first end plate; FIG. 9B shows a front face of the first end plate; and FIG. 9C shows a schematic view of dissembling the electronic components mounted on the first end plate from the first end plate.

As shown in FIG. 9A, the first end plate 107 has a first end plate body 920, a material of the first end plate body 920 being identical to the material of the housing 102, i.e., the first plastic material. A circuit board 901 may be mounted on the reverse face 908 of the first end plate 107. As will be described in detail in conjunction with FIG. 15, a control circuit 1501 is provided on the circuit board 901, for circuit control of the battery pack 100. The circuit board 901 has several plugins 929, for connecting the circuit board 901 with the components in the battery pack 100, e.g., the battery cell 103, the tan assembly 111, the relay 1001, and the fuse 1002 or the like (see FIG. 15), thereby monitoring or controlling these components through the control circuit 1501. An upper end of the first end plate body 920 is provided with a protruding portion (931, 932), the protruding portion (931, 932) forming a ventilation guide slot 905. After the battery pack 100 is assembled, the ventilation guide slot 905 is fit with the bearing plate 105 to form a middle gas discharging passage 732 (see FIG. 7) to communicate the lateral gas discharging passage 730 with the vertical gas discharging passage 733. The first end plate 107 further has an end plate bus bar 935 for connecting an anode output end of the serially connected battery cells 103 to a first leading-out terminal 424.1 (a leading-out terminal shown in FIG. 8A), so as to connect the anode output end of the battery pack 100 to the outside of the battery pack 100 via the metal wiring terminal 431.1 for connecting an external load. Two ends of the upper portion of the plate body 920 are also provided with holes (970.1, 970.2) for connecting with the housing 102.

As shown in FIG. 9B, a front face of the first end plate 107 has a fence-like structure, forming several crisscrossed reinforcing ribs 923. The reinforcing ribs 923 face towards the several serially connected battery cells 103, for contacting one battery cell at the outermost side of the several serially connected battery cells 103, so as to support the several battery cells with the second end plate 109 (see FIG. 10) in a horizontal direction. The fence-like structure reinforces the intensity of the first end plate 107, such that it can resist an expansion force from the battery cells more strongly, thereby limiting the expansion of the battery cells. Moreover, the above structure further saves the material of manufacturing the first end plate, reduces the weight of the first end plate, and thus makes the battery pack 100 lighter.

As illustrated in FIG. 9C, the circuit board 901 is secured onto the first end plate 107 via several bolts (971.1, 971.2, 971.3, and 971.4), and the first end plate bus bar 935 is secured onto the circuit board 901 to be electrically conducted with the circuit board 901. The first end plate bus bar 935 has a bus bar first end 937 and a bus bar second end 939, wherein the bus bar first end 937 is connected to the first leading-out terminal 424.1 of the battery pack 100, and the bus bar second end 939 is connected to the bus bar on the battery cell 103 adjacent to the first end plate 107, thereby connecting the anode output end of the several battery cells 103 to the first leading-out terminal 424.1.

Figure 10A:
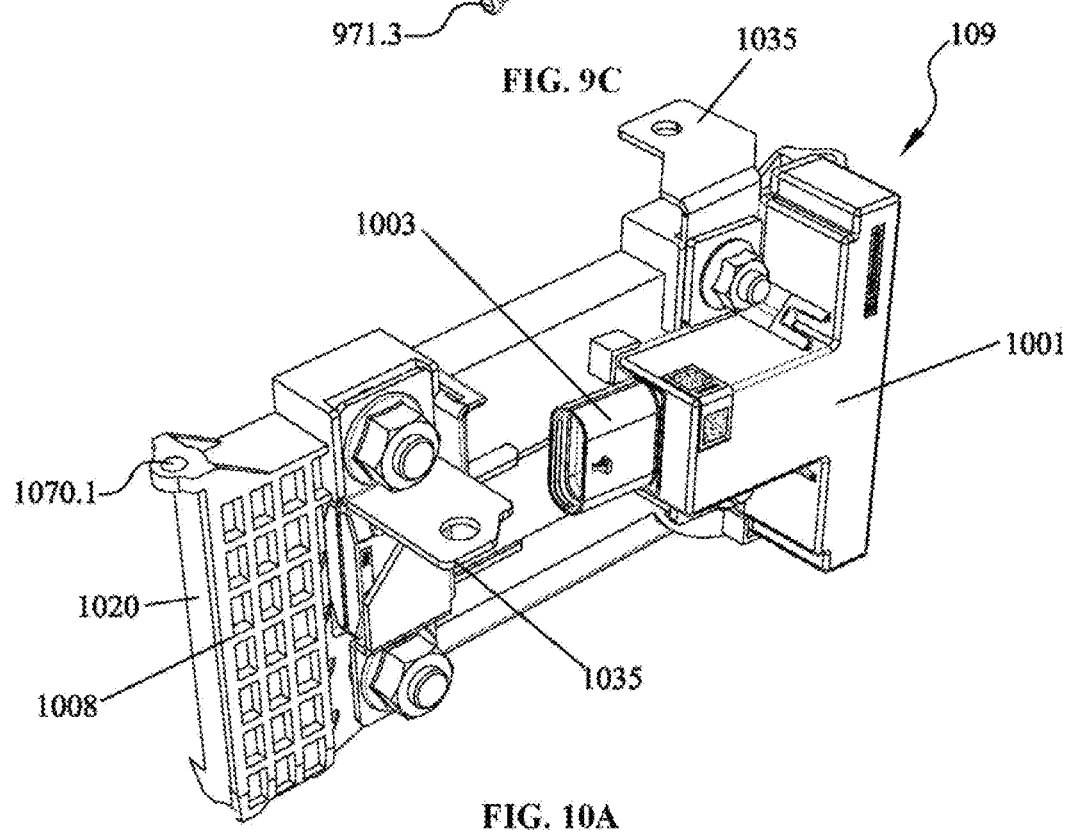
FIG. 10A is a schematic diagram of a reverse face of a second end plate of a battery pack of the present disclosure.
Figure 10B:
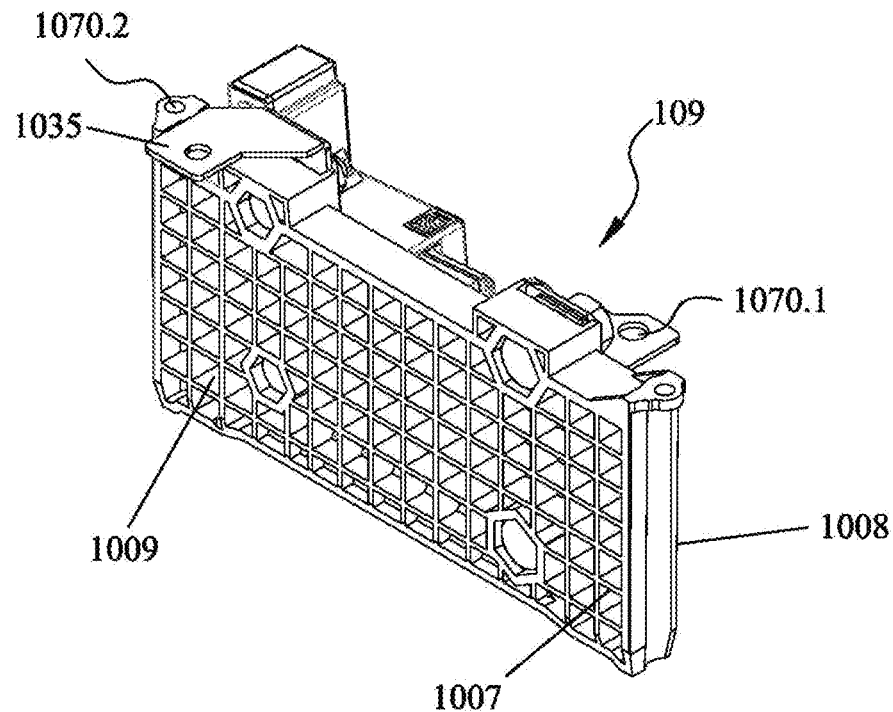
FIG. 10B is a schematic diagram of a front face of the second end plate of the battery pack of the present disclosure.
Figure 10C:
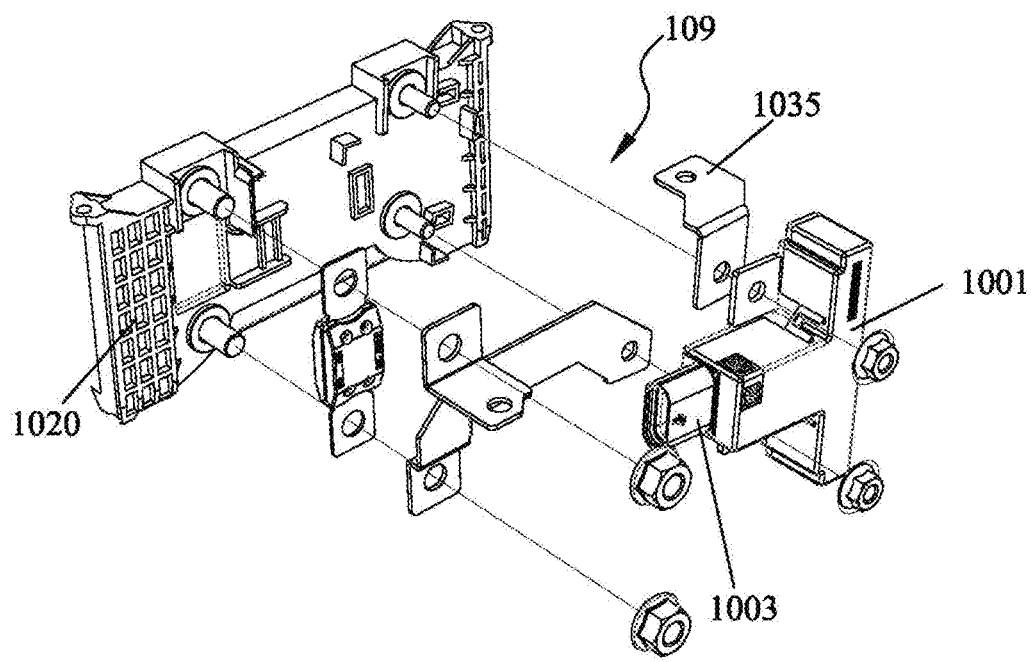
FIG. 10C is an exploded view of the second end plate of the battery pack of the present disclosure.

FIGS. 10A, 10B and 10C show a second end plate of the battery pack of the present disclosure, wherein FIG. 10A shows a reverse face of the second end plate, FIG. 10B shows a front face of the second end plate, and FIG. 10C shows a schematic diagram of dissembling the electronic components mounted on the second end plate from the second end plate.

As illustrated in FIG. 10A, the second end plate 109 has a plate body 1020 on which electronic components and a second end plate bus bar 1035 may be mounted. The electronic components include, tier example, a relay 1001 shown in FIG. 10A and a fuse 1002 shown in FIG. 10C. Two ends of the upper portion of the second end plate body 1020 have holes (1070.1, 1070.2) for connecting with the housing 102.

As shown in FIG. 10B, a front thee of the second end plate 109 has a fence-like structure, forming several crisscrossed reinforcing ribs 1023, wherein the reinforcing ribs 1023 face the several serially connected battery cells 103, for contacting with an adjacent battery cell 103, thereby cooperating with the first end plate 107 to support the several battery cells 103 in a horizontal direction. The fence-like structure reinforces the strength of the second end plate 109, such that it may resist an expansion force from the battery cells more intensively, thereby limiting expansion of the battery cells. Moreover, the above-described structure also saves the material of manufacturing the first end plate, reduces the weight of the first end plate, and thus makes the battery pack 100 lighter.

As shown in FIG. 10C, it shows more clearly the electronic components on the second end plate 109 and multiple second end plate bus bars 1035, wherein the electronic components may be mounted on the plate body 1020 of the second end plate 109 via fasteners. The electronic components (e.g., the fuse 1002 and the relay 1001) are connected via multiple second end plate bus bars 1035. A relay plugin 1003 is provided on the relay 1001; a relay plugin corresponding to the relay is provided on the circuit board 901 on the first end plate 107; the relay plugins 1003 may be inserted onto the plugins corresponding to the relay on the circuit board 901 via the harness first segment 120.1 and the harness fourth segment 120.4, such that the control circuit 1501 of the circuit board 901 may control the relay 1001. Multiple second end plate bus bars 1035 also connect the cathode output end of the serially connected battery cells to the second leading-out terminal 424.2 (the leading-out terminal shown in FIG. 8A), such that the cathode output end of the several battery cells 103 is connected to the outside of the battery pack 100 via the metal wiring terminal 431.1, for connecting the external load.

Figure 11:
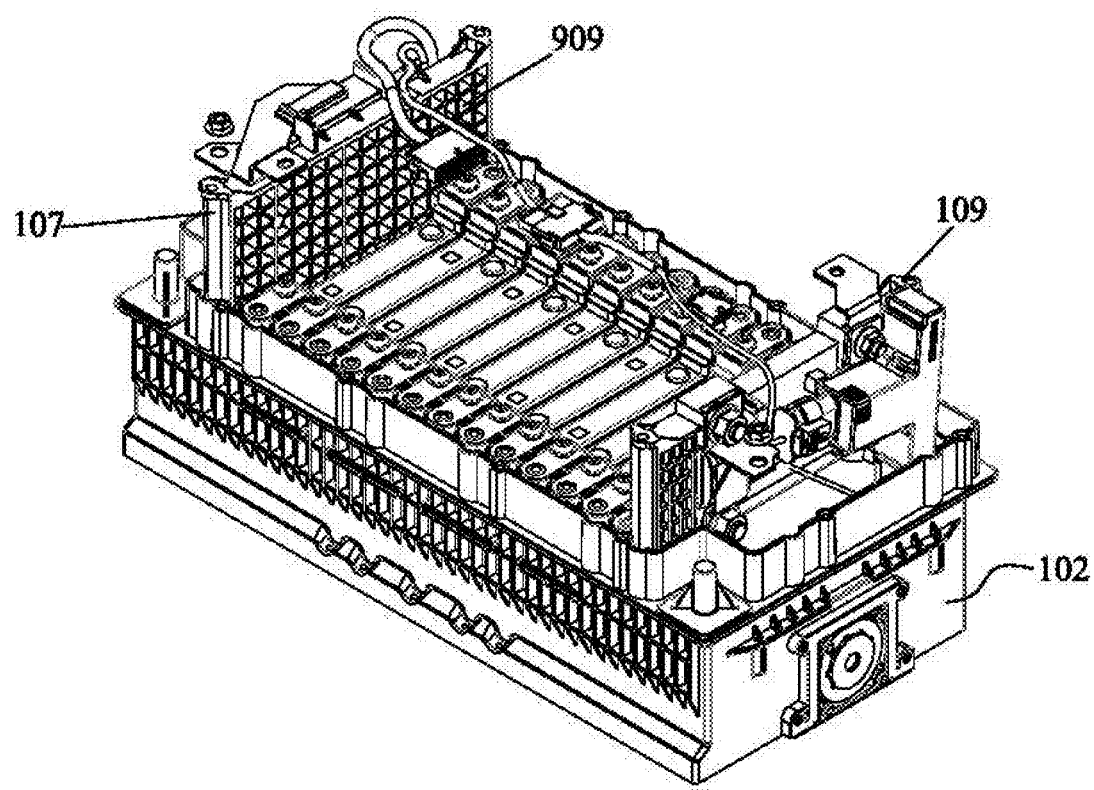
FIG. 11 shows that a first end plate and a second end plate are being mounted into a housing already mounted with several battery cells.

FIG. 11 shows that the first end plate 107 and the second end plate 109 are being mounted into the housing in which several battery cells 103 have been already mounted. As shown in FIG. 11, the front face of the first end plate 107 and the front face of the second end plate 109 face toward the several sequentially arrayed battery cells 103, respectively; and the front face of the first end plate 107 and the front face of the second end plate 109 are in contact with the outermost two of the several battery cells 103, respectively, so as to support the several battery cells 103 in a horizontal direction and generate a pressure against the several battery cells 103, which limits expansion of the battery cells 103 to a certain extent and prolongs the service life of the battery. After the first end plate 107 and the second end plate 109 are inserted into the housing 102, the two end plates are secured on the housing 102 via the holes (970.1, 970.2) at two ends of the upper portion of the first end plate 107 and the holes (1070.1, 1070.2) at two ends of the upper portion of the second end plate 109, respectively. The circuit board 901 on the first end plate is electrically conducted with the electronic components on the second end plate 109 via the harness 120.

Figure 12:
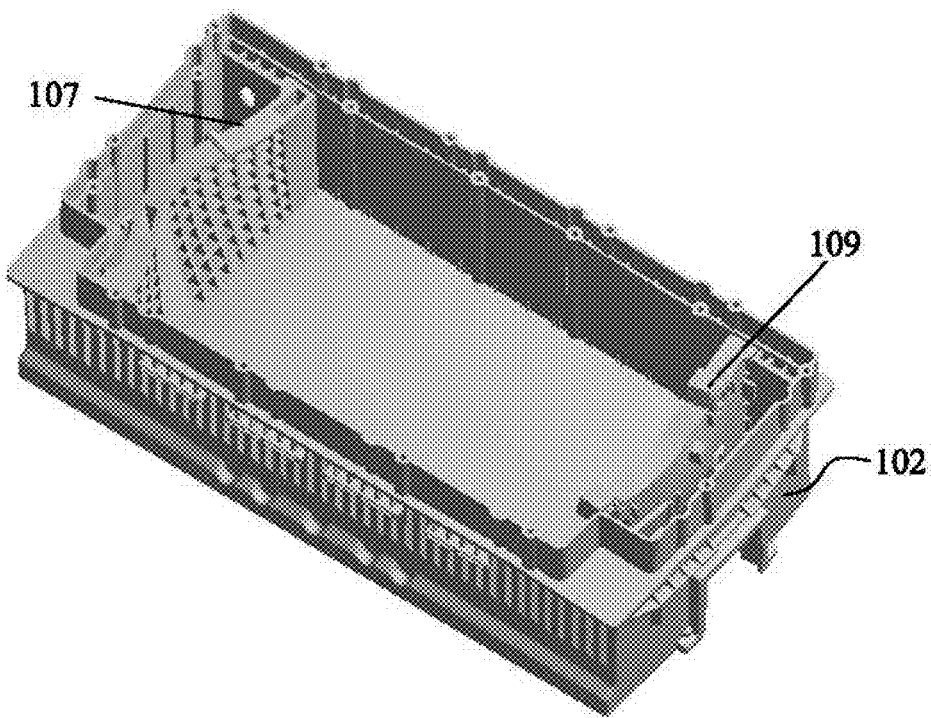
FIG. 12 is a simulation diagram when a first end plate and a second end plate of the battery pack of the present disclosure deform.

FIG. 12 shows a simulation diagram of the first end plate and the second end plate deforming under pressure. During use of the battery, gas may be generated inside each battery cell 103, which causes expansion of the housing of the battery 103. Slight expansion of the battery unit 103 does not affect its use; however, accumulation of slight expansion of each battery cell 103 will cause the size of the several battery cells 103 to have a certain displacement against the original state; therefore, the battery pack 103 comprised of several battery cells 103 needs to be capable of accommodating size changes of the several battery cells 103. The first end plate 107 and the second end plate 109 of the present disclosure can deform to a certain extent such that while supporting the several battery cells 103 and limiting movements of the battery cells 103 in a horizontal direction, they can accommodate size changes of the several battery cells 103. In a simulation experiment of the present disclosure, the maximum deformation displacement of the first end plate 107 and the second end plate 109 may reach 12.16 mm. After the first end plate 107 and the second end plate 109 are inserted into the housing 102, a gap exists between the first end plate 107 and the first width side wall 407; and a gap exists between the second end plate 109 and the second width side wall 409, such that they can accommodate the deformation of the two end plates bending towards two outsides caused by expansion of the several battery cells to enable the shape of the housing of the battery pack 100 to maintain unchanged, facilitating a user to design the size of the accommodation cavity of the battery pack 100.

The present disclosure provides two end plates separate from the housing of the battery pack, which may not only play a role of supporting the several battery cells as mentioned above so as to absorb the expansion of the battery cells, but also may bear various electronic components, such that the electronic components may be arranged at a side face of the battery pack, rather than concentratively borne at the upper portion of the battery pack by the bearing plate, which may more facilitate structural design of the battery pack. Additionally, because the two end plates may be dissembled from the housing of the battery pack, it will become easier to maintain or change the electronic components mounted on the end plate.

Figure 13A:
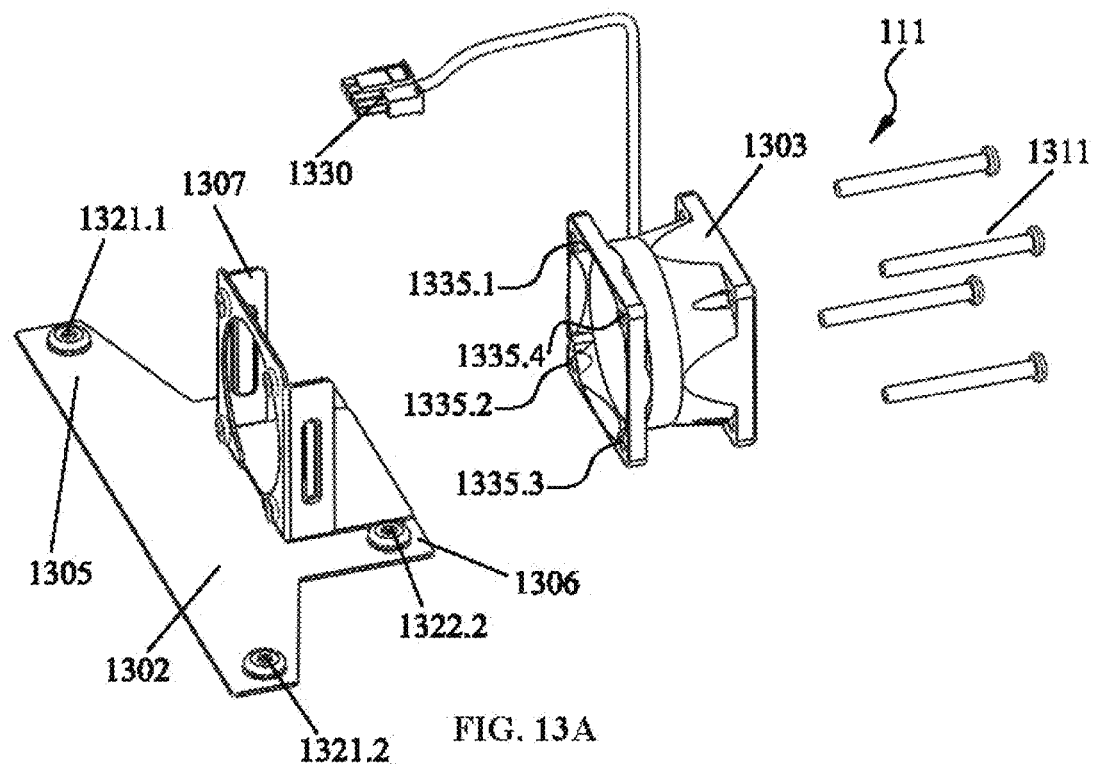
FIG. 13A is an exploded schematic view of a fan assembly in the battery pack shown in FIG. 1A.
Figure 13B:
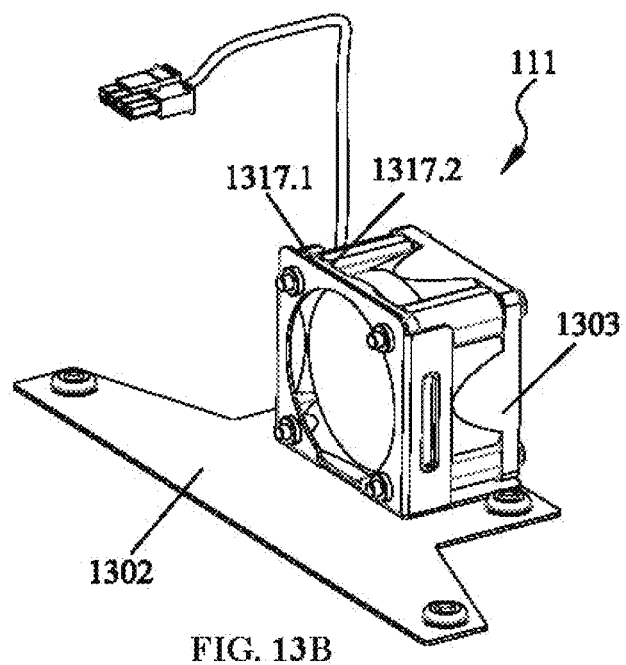
FIG. 13B is an assembly schematic diagram of a fan assembly in the battery pack shown in FIG. 13A.

FIGS. 13A and 13B show a fan assembly in the battery pack shown in FIG. 1A. As shown in FIG. 13A, the fan assembly 111 comprises a fan mounting base plate 1302, a fan mounting bracket 1302, and a fan 1303. The fan mounting base plate 1302 has a proximal end 1305 and a distal end 1306; the fan mounting bracket 1307 is mounted at a distal end 1306 of the fan mounting base plate 1302; the fan mounting bracket 1307 may be connected to the fan mounting base plate 1302 by welding or in other manners such as bolts. The fan mounting base plate 1302 and the fan mounting bracket 1307 are both made of metal materials, such as a cold-rolled sheet. Several mounting holes (1335.1, 1335.2, 1335.3, 1335.4) are provided at an axial outside portion of the fan 1303, and the fan 1303 may be secured on the fan mounting bracket 1307 via a side fastener 1331. A width of the proximal end 1305 of the fan mounting base plate 1302 is larger than a width of a distal end 1306 of the fan mounting base plate 1302, such that a trapezoid transition edge is formed between the width of the proximal end 1305 of the fan mounting base plate 1302 and the width of the distal end 1306 of the fan mounting base plate 1302. A width of the fan mounting bracket 1307 is smaller than a width of the distal end 1306 of the fan mounting base plate 1302. A pair of oppositely disposed distal end mounting holes (1322.1, 1322.2) are provided on two edges of the distal end 1306 of the fan mounting base plate 1302, and a pair of oppositely disposed proximal end mounting holes (1321.1, 1321.2) are provided on two edges of the proximal end 1305 of the fan mounting base plate 1302. When the fan mounting bracket 1307 is mounted on the distal end 1306 of the fan mounting base plate 1302, a side bracket edge is formed at two sides of the distal end 1306 of the fan mounting base plate 1302, where the bracket edge may accommodate the distal end mounting holes 1322.

Still as shown in FIG. 13, a fan assembly plugin 1330 is provided on the fan assembly 111. A corresponding fan assembly plugin is provided on the circuit board 901 of the battery pack 100. When the fan assembly 111 is mounted into the housing 102, the fan assembly plugin 1330 may be electrically inserted into the corresponding fan assembly plugin on the circuit board 901 via the harness 120, such that the fan assembly 111 may be electrically connected with the circuit board 901 to enable the circuit board 901 to monitor a working state of the fan assembly 111.

Figure 14A:
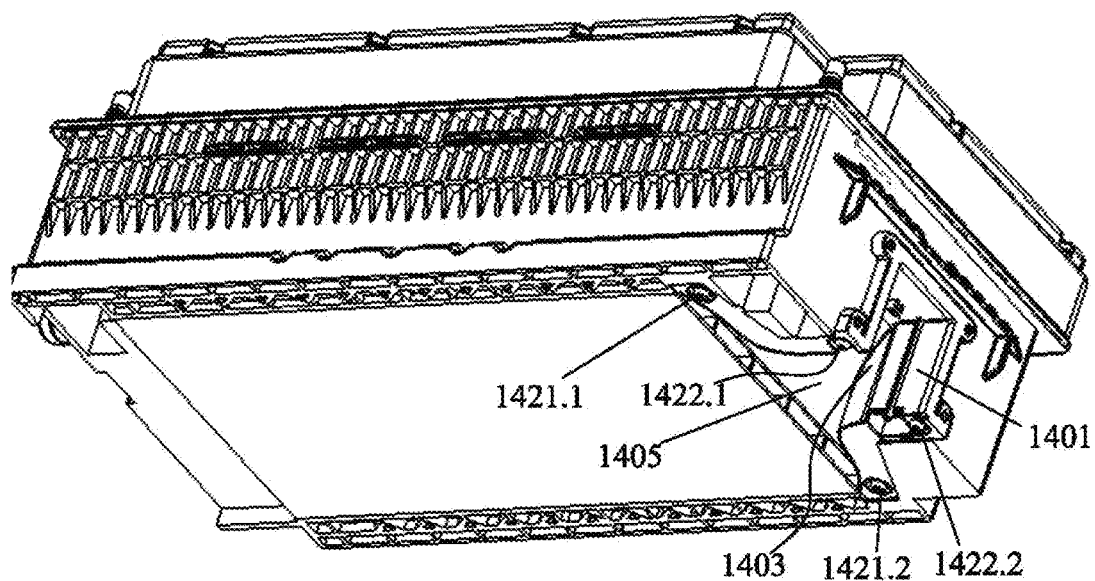
FIG. 14A is a stereoscopic schematic view from another perspective of the housing of the battery pack of the present disclosure.

FIG. 14A shows the housing 102 without mounting a fan. In the present disclosure, the fan assembly 111 is a component optionally configured such that a user may optionally select the fan assembly 111 according to heat dissipation demands; with a low heat dissipation demand, the battery pack 100' without mounting the fan assembly 111 may work normally.

With reference to FIG. 14A and FIG. 7, the housing bottom portion 102 has a heat dissipation apparatus 701 that is made of a metal with a better heat conductivity, e.g., aluminum. The heat dissipation apparatus is substantially of a cylindrical structure having openings at both ends to form an air passage 702. The air passage has an air passage inlet 703 and an air passage outlet 705. According to one embodiment of the present disclosure, a width of the air passage 702 is substantially equivalent to the width of the battery cell 103. The heat dissipation apparatus 701 is embedded into a bottom portion of the housing 102 during a molding process of the housing 102. As shown in FIG. 1C and FIG. 7, a heat dissipation pad 140 is provided above the heat dissipation apparatus 701, and the heat dissipation pad 140 is mounted into the housing from the opening 410 of the housing 102. The heat dissipation pad 140 contacts the heat dissipation apparatus 701 to conduct heat generated by the several battery cells 103 to the heat dissipation apparatus 701.

When the fan assembly 111 is not configured in the battery pack, the heat is absorbed, conducted, and dissipated by walls of the air passage 702. When the fan assembly 111 is configured in the battery pack, the fan assembly 111 guides air to flow in via the air passage inlet 703 and to be discharged out from the air passage outlet 705 via the fan. The fan assembly 111 accelerates air flow in the air passage 702 to dissipate the heat of the heat dissipation apparatus 701 more quickly, and accelerates the heat dissipation rate of the battery pack 100.

As illustrated in FIG. 14A, the housing 102 has a fan assembly side wall opening 1401 and a fan assembly mounting accommodation cavity 1403. The fan assembly side wall opening 1401 is provided on the second width side wall 409, and has a width matching the width of the fan 1303 such that the fan may discharge hot air out of the housing 102 from the air passage 702. The fan assembly mounting accommodation cavity 1403 extends upwards to a top portion of the housing 102 from the bottom face of the housing 102, for accommodating the fan 1303 and its mounting bracket 1307. The fan assembly mounting accommodation cavity 1403 is in fluid connection with the fan assembly side wall opening 1401 and the outlet 705 of the air passage 702; however, the fan assembly mounting accommodation cavity 1403 is not in communication with an internal space of the housing 102 accommodating the battery cells 103.

The housing 102 has a bottom portion opening 1405 in communication with a mounting accommodation cavity 1403. A shape of the bottom portion opening 1405 matches the shape of the fan mounting base plate 1302. The fan assembly mounting accommodation cavity 1403 and the bottom portion opening 1405 of the housing 102 are designed such that the fan assembly 111 may be inserted into the fan assembly mounting accommodation cavity 1403 from the bottom portion opening 1405 of the housing 102 to enable a proximal end 1305 of the fan mounting base plate 1302 to substantially overlap with an edge of the bottom portion 401 of the housing 102, and to enable the fan mounting base plate 1302 to cover the bottom portion opening 1405 of the housing 102. According to an embodiment of the present disclosure, a width of the fan assembly side wall opening 1401 may be configured to be slightly larger than the width of the fan mounting bracket 1307 so that the fan assembly 111 may be more readily mounted into the fan assembly mounting accommodation cavity 1403 or disassembled from the fan assembly mounting accommodating cavity 1403.

Mounting holes (1422.1, 1422.2) and mounting holes (1421.1, 1421.2) corresponding to distal end mounting holes (1322.1, 1322.2) and proximal end mounting holes (1321.1, 1321.2) on the fan mounting base plate 1302 are provided at the bottom portion of the fan assembly side wall opening 1401, respectively, so as to secure the fan mounting base plate 1302 bearing the fan 1303 to the bottom portion of the housing using fasteners.

It may be seen from FIG. 14A that the fan assembly mounting accommodation cavity 1403 is relatively wide at a position proximal to the outlet 705 of the air passage 702, and is substantially equivalent to the width of the outlet 705 of the air passage 702, to facilitate discharging the hot air in the air passage 702. However, the fan assembly mounting accommodation cavity 1403 is relatively narrow at a position proximal to the fan assembly side wall opening 1401, and is substantially equivalent to the widths of the fan 1303 and its mounting bracket 1307, to provide support to the fan assembly in a width direction of the housing. Therefore, the fan assembly mounting accommodation cavity 1403 has a substantially trapezoid shape in the length direction of the housing, and the bottom portion opening 1405 of the fan assembly mounting accommodation cavity 1403 also has a trapezoid shape substantially matching it. The above-mentioned forming a trapezoid transition edge between a width of the proximal end 1305 of the fan mounting base plate 1302 and a width of the distal end 1306 of the fan mounting base plate 1302 is to match the shape of the bottom portion opening 1405 of the fan assembly mounting, accommodation cavity 1403 to seal the bottom portion opening 1405.

Figure 14B:
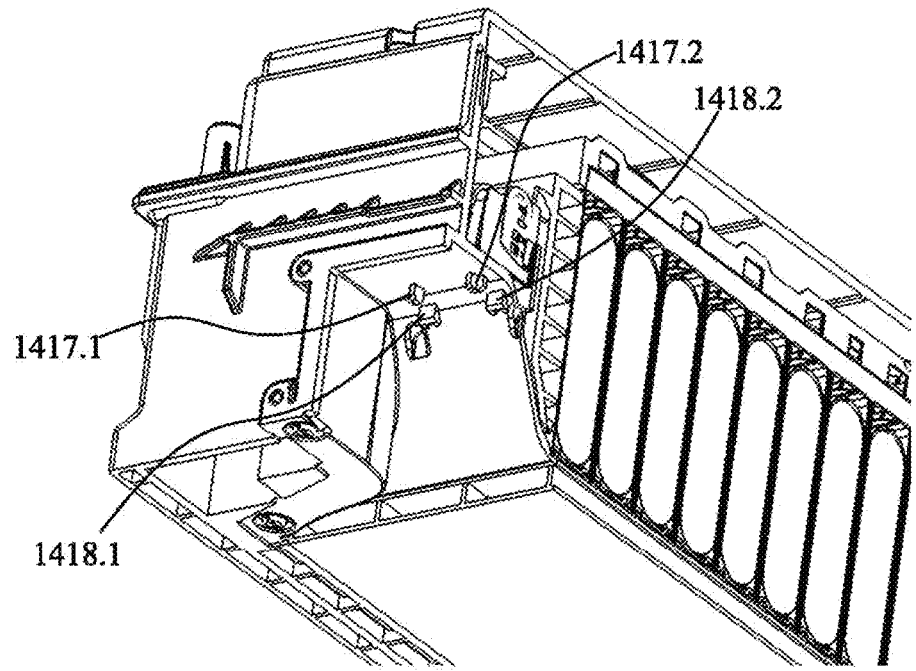
FIG. 14B is a partial sectional view along B-B line in FIG. 1B.

FIG. 14B is a partial sectional schematic view along a B-B line in FIG. 1B, which shows a blocking part in the fan assembly mounting accommodation cavity 1403 for limiting a movement of the fan assembly in a length direction of the housing 102. Specifically, as illustrated in FIG. 13B, an upper portion of the fan 1303 has a side edge 1317.1, and the fan mounting bracket 1307 has a side edge 1317.2; after the fan 1303 is mounted on the fan mounting bracket 1307, a thickness h is formed between the side edge 1317.1 of the fan 1303 and the side edge 1317.2 of the fan mounting bracket 1307. As shown in FIG. 14B, the fan assembly mounting accommodation cavity 1403 has a first blocking portion (1417.1, 1417.2) and a second blocking portion (1418.1, 1418.2), wherein a distance between the first blocking portion (1417.1, 1417.2) and the second blocking portion (1418.1, 1418.2) is arranged to be capable of accommodating the thickness h formed between the side edge 1317.1 of the fan 1303 and the side edge 1317.2 of the fan mounting bracket 1307. Therefore, when the fan assembly 111 is mounted in the fan mounting accommodation cavity 1403, an upper portion of the fan assembly may be stuck between the first blocking portion (1417.1, 1417.2) and the second blocking portion (1418.1, 1418.2) to limit a movement of the fan assembly 111 in the horizontal direction relative to the housing 102. As an embodiment, the first blocking portion (1417.1, 1417.2) in the fan assembly mounting accommodation cavity 1403 extends from the top portion of the fan assembly mounting accommodation cavity 1403 to the bottom portion opening 1405 of the housing 102, while the second blocking portion (1418.1, 1418.2) extends from a side face of the fan assembly mounting accommodation cavity 1403 towards the fan assembly side wall opening 1401.

Figure 14C:
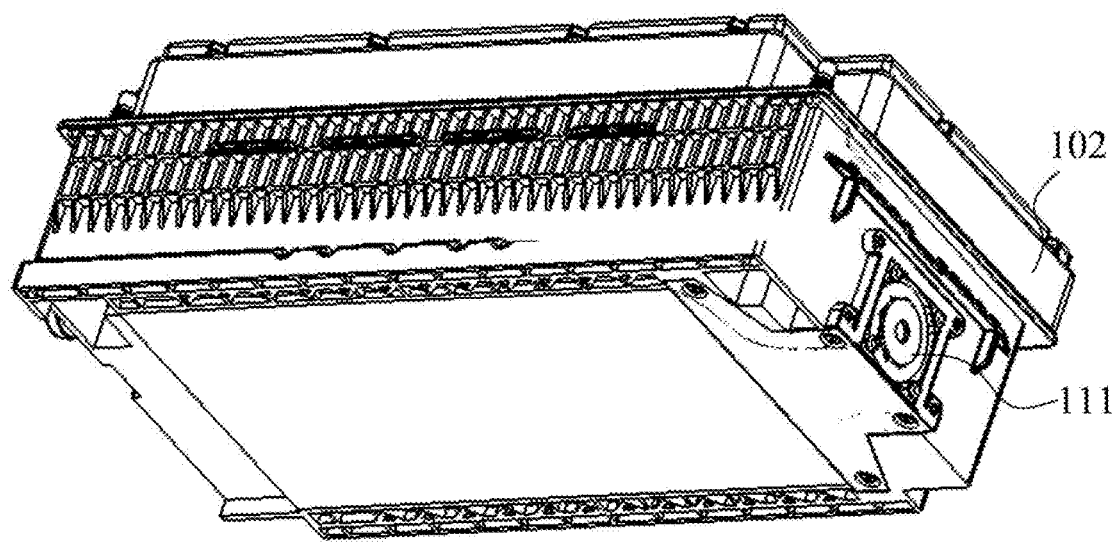
FIG. 14C is a schematic diagram of the housing in FIG. 14A mounted with a fan.

FIG. 14C shows a housing 102 mounted with a fan assembly 111. In the present disclosure, the above-described mounting structure of the fan assembly 111 enables the fan assembly 111 to be conveniently disassembled so that the battery pack may or may not be provided with the fan assembly 111 as needed. After the bottom portion fasteners are dismantled and the fan assembly plugin 1330 is disengaged from the corresponding fan assembly plugin on the circuit board 901, the fan assembly 111 can be drawn out downwardly from the bottom portion opening 1405 of the housing 102.

Figure 15:
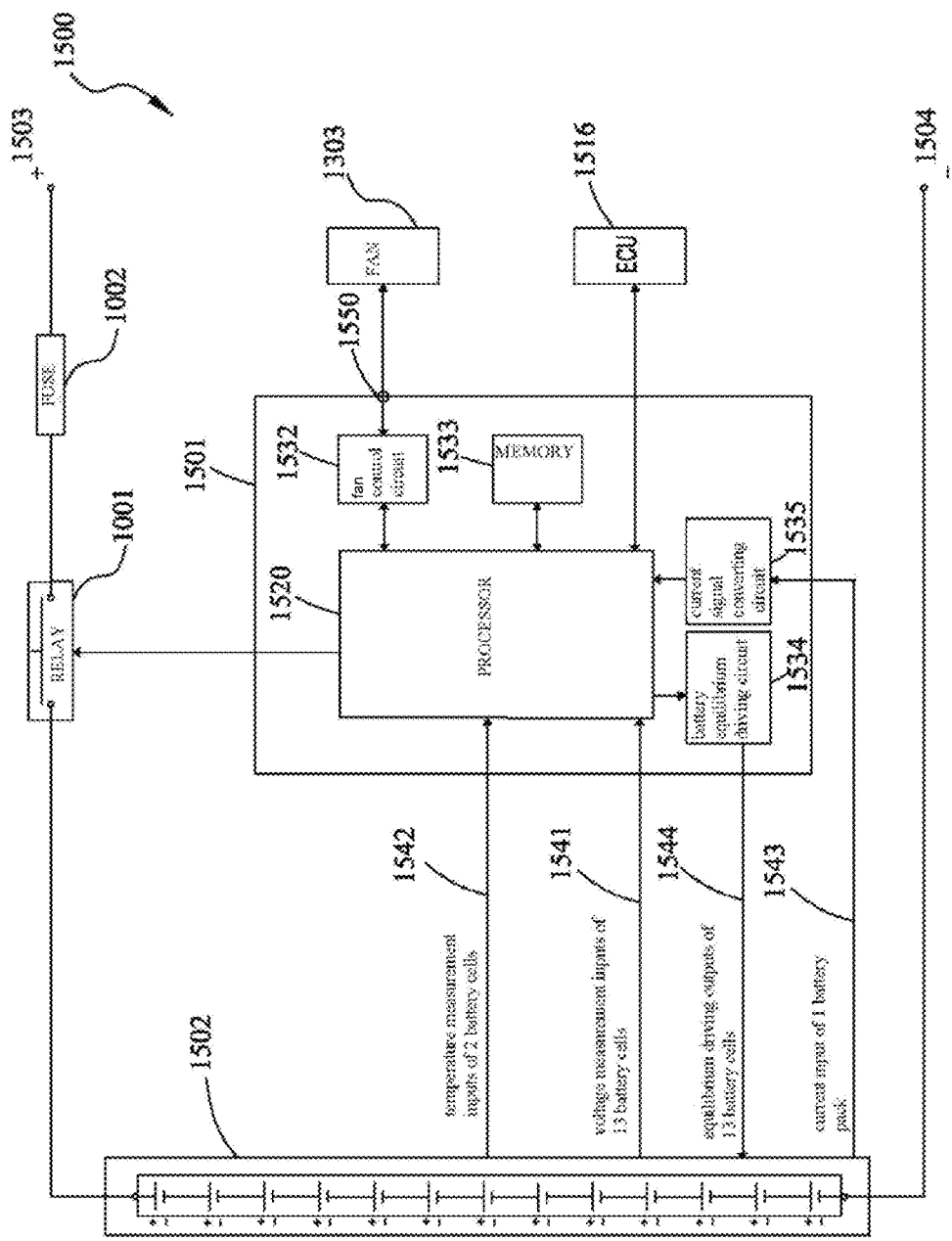
FIG. 15 is a schematic diagram showing a battery pack control system 1500 according to the present disclosure.

FIG. 15 shows a battery pack control system 1500. As shown in FIG. 15, the battery pack control system 1500 comprises a battery 1502 comprised of 13 battery cells connected in series, a battery positive output end 1503, a battery negative output end 1504, a control circuit 1501, a relay 1001, a fuse 1002, a fan 1303, and a hybrid vehicle control unit (ECU) 1516. The 13 battery cells are connected in series through the battery cell bus bars 163 to form the battery 1502.

The control circuit 1501 comprises a processor 1520, a fan control circuit 1532, a memory 1533, a battery cell equilibrium driving circuit 1534, and a current signal switching circuit 1535. The fan control circuit 1532, the memory 1533, the battery cell equilibrium driving circuit 1534, and the current signal switching circuit 1535 are connected with the processor 1520 and operate under control of the processor 1520.

The processor 1520 may read programs (including a series of instructions) and data stored in the memory 1533; the processor 1520 may also store data into the memory 1533. By executing the programs stored in the memory 1533, the processor 1520 may control operation of the battery pack control system 1500.

The battery positive output end 1503 is connected to the positive end of the 13 battery cells connected in series via the relay 1001 and the fuse 1002. Upon instant surging of the current, the fuse 1002 is disconnected to cut off the current output circuit. The relay 1001 is connected to the processor 1520; under control of the processor 1520, the relay 1001 is switched from a connected state to a disconnected state to cut off the current output circuit. The battery positive output end 1503 and the battery group negative output end 1504 are connected to an external load (e.g., a motor of a hybrid vehicle). The fan 1303 is connected to the fan control circuit 1532, and a rotatory speed of the fan 1303 is adjusted under control of the processor 1520.

There are 4 different types of input or output signals at the battery 1502 and the control circuit 1501. The first type of inputs 1541 refers to 13 voltage inputs measured from the 13 battery cells, which are inputted from the battery 1502 to the control circuit 901, so that the control circuit 1501 may monitor the voltage state of the 13 battery cells during operation to control operation of the battery 1502 based on the voltage states of all of the 13 battery cells.

The second type of input signals refers to 2 temperature inputs 1542 measured from 2 selected battery cells, which are inputted from the battery 1502 to the control circuit 1501, so that the control circuit 1501 may monitor the temperature state of the battery pack during operation to control operation of the battery 1502 based on the temperature of the selected 2 battery cells. Of course, the purpose of monitoring the temperature state of the battery pack may also be implemented by selecting to measure the temperature input of a single battery cell.

The third type of input signals refers to a current input 1543 from the battery negative end, which is connected to a current signal converting circuit 1535 that converts current signals into voltage signals that are inputted to the processor 1520, so that the control circuit 1501 monitors an output/input current state of the battery pack during operation, to control operation of the battery 1502 based on the output/output current state of the battery pack. In the embodiments of the present disclosure, the first, second, and third types of input signals are connected to the control circuit 1501 via the harness 120.

The first type of output signals refers to 13 drive outputs 1544 from the battery cell equilibrium drive circuit 1534; the 13 drive outputs 1544 are connected to the positive and negative ends of the 13 battery cells, respectively, to charge or discharge the 13 battery cells under control of the processor 1520, to maintain equilibrium of the voltages of the 13 battery cells during operation. The first type of outputs is also connected to the positive and negative output ends of the 13 battery cells via the harness 120.

In the battery pack control system 1500, a battery cell voltage upper limit value, a battery cell voltage lower limit value, a battery cell voltage difference upper limit value, a temperature upper limit value, a temperature lower limit value, and an operating current upper limit value are set. During operation, when a voltage of a certain battery cell detected by the processor 1520 is higher than the battery cell voltage upper limit value or lower than the battery cell voltage lower limit value, or when a voltage difference value between any two battery cells as detected is higher than the voltage difference upper limit value, or when a temperature of the battery 1502 as detected is above the temperature upper limit value/below the temperature lower limit value, or when an output current of the battery 1502 as detected exceeds the upper limit value of the operating current, the processor 1520 emits a cutoff signal to the relay 1001, causing the relay 1001 to change from the connected state to the disconnected state to cut off the current output circuit.

Moreover, during operation, the processor 1520 detects whether the battery pack control system 1500 is connected with a fan 1303 through a port 1550 (e.g., by detecting the resistance amount of the port 1550). If the processor 1520 detects that the battery pack control system 1500 is not connected with the fan 1303, the processor 1520 will not perform wind speed control. If the processor 1520 detects that the battery pack control system 1500 is connected with the fan 1303, the processor 920 will constantly emit a signal (e.g., PWM-duty cycle signal) to control the rotating speed of the fan 1303 based on the detected battery temperature.

In addition, during operation, the processing 1520 detects the voltage of each battery cell of the 13 battery cells; if needed, the processor 1520 initiates the battery cell equilibrium drive circuit 1544, selects a battery cell, and charge (increasing the voltage) or discharge (decreasing the voltage) it, causing the voltage differences among the 13 battery cells to reach an equilibrium within a prescribed scope.

Further, the processor 1520 emits corresponding control signals to the hybrid vehicle control unit based on the detected voltage state of the 13 battery cells, the temperature state of the selected 2 battery cells, and the battery current output state, to enable an external load (e.g., a motor of the hybrid vehicle) to run in an optimum operation state.

The battery pack provided by the present disclosure used in a micro-hybrid vehicle enhances fuel efficiency and reduces exhaust emissions, particularly CO2 gas emissions. As hybrid vehicles increasingly use some components with a larger power, e.g., an electric air-conditioner, an electric turbocharger, and an electric power steering, etc., a battery that may provide a larger power is needed. The 48V, 10 Ah battery pack provided by the present disclosure can enable a traditional hybrid vehicle to save about 15% fuel, and to have a compact structure and a small size. When an extreme circumstance occurs to the battery pack, the battery cells will be broken to release gas, avoiding risks from the battery pack; in prior designs, a gas discharging passage needs to be designed for the battery pack to discharge the gas released from breaking of the battery cells outside of the battery pack; while in the present disclosure, an improvement is made by using the structure of the battery pack per se to form a gas discharging passage, which makes it unnecessary to additionally design a specific gas discharging passage; in this way, the present disclosure saves materials and space and makes the structure of the battery pack compact. The battery pack provided by the present disclosure further comprises two end plates disposed at two sides of the battery cells, respectively; in addition to bearing the electronic components and connecting a circuit, the two end plates also play a role of supporting the several battery cells to facilitate mounting the battery cells and provide a certain pressure against the battery cells thereby to limit expansion of the battery cells within a certain extent and prolong the service life, of the battery cells; moreover, they may deform to absorb expansion of the battery cells to enable the housing of the entire battery pack to maintain unchanged. In the present disclosure, the material surrounding the metal wiring, terminals is different from the material of the housing, wherein a material with good insulation and anti-corrosion performance is adopted surrounding the metal wiring terminal, while the housing adopts a material with good mechanical performance; the material surrounding the metal wiring terminal may tolerate a temperature rise and possible corrosion of the metal wiring terminals during the battery use, while the material of the housing has a relatively high strength and hardness, which may protect internal components of the battery pack. The present disclosure also provides an optional fan assembly such that a user may select whether to equip based on different heat dissipation needs; in a low heat dissipation demand, the fan assembly may not be mounted, and heat dissipation may be implemented only by means of the heat dissipation apparatus at the bottom portion of the battery pack, which may lower the cost for some users.

Although only some features of the present disclosure are illustrated and described, various improvements and changes may be made by those skilled in the art. Therefore, it should be understood that the appended claims are intended to cover all improvements and changes within the substantive spirit of the present disclosure.

We claim:

1. A battery pack comprising:
multiple battery cells, each of the multiple battery cells is provided with a battery cell anode and a battery cell cathode;
a housing having a first width side wall and a second width side wall, the housing further including a top, a bottom, and two opposing length side walls;
a first end plate and a second end plate, the first end plate positioned between the first width side wall and the multiple battery cells, and the second end plate positioned between the second width side wall and the multiple battery cells;
a middle recessed portion positioned on a top surface of each of the multiple battery cells, the middle recessed portion formed between the battery cell anode and the battery cell cathode disposed on the top portion of each of the multiple battery cells;
a surface of the middle recessed portion including at least one seal-breakable opening, the at least one seal-breakable opening is arranged to discharge a gas generated in the battery cell when broken;
when the multiple battery cells are continuously arranged and mounted in the housing, the middle recessed portions at the top portions of the multiple battery cells form a battery top portion through-slot; and a bearing plate having a bottom portion provided with a bearing plate bottom portion through-slot, and when the bearing plate is mounted at the top portions of the multiple battery cells, the bearing plate bottom portion through-slot is press-fitted with the battery top portion through-slot to form a lateral gas discharging passage, wherein the lateral gas discharging passage has an outlet, and a distal end of the lateral gas discharging passage is sealed by a blocking plate;

a vertical gas discharging passage disposed on an inner side of the first width side wall, wherein the vertical gas discharging passage is in fluid communication with the lateral gas discharging passage; and a ventilation guide slot positioned in an upper end of the first end plate, and the ventilation guide slot is located between the lateral gas discharging passage and the vertical gas discharging passage to enable the lateral gas discharging passage to be in fluid communication with the vertical gas discharging passage.

2. The battery pack according to claim 1, further comprising a gas discharging port on the first width side wall to provide an outlet for the vertical gas discharging passage.

3. The battery pack according to claim 1, wherein the bottom portion is provided with a heat dissipation apparatus, wherein the heat dissipation apparatus is provided with an air passage, and the air passage has an inlet and an outlet.

4. The battery pack according to claim 3, wherein the heat dissipation apparatus is provided with a heat dissipation pad, and two sides of the heat dissipation pad are in contact with the bottom portions of the multiple battery cells and an upper portion of the air passage respectively.

5. The battery pack according to claim 1, further comprising:
a circuit board, wherein a control circuit is mounted on the circuit board; and
a harness, wherein the harness is mounted on the bearing plate, and the harness comprises multiple connection wires to connect each of the multiple battery cells to the control circuit.

6. The battery pack according to claim 5, wherein:
the battery cell anode and the battery cell cathode of each of the multiple battery cells protrude from the top portion of each battery cell;
the bearing plate is provided with multiple mounting windows; and
the battery pack further comprises:
multiple battery cell bus bars, wherein the multiple battery cell bus bars are mounted in multiple windows of the bearing plate to connect in series the anode and the cathode of each of the multiple battery cells, so as to form a positive output end and a negative output end of the battery cells connected in series;
multiple battery cell fasteners for connecting the multiple battery cell bus bars to the anodes and/or cathodes of the corresponding battery cells.

7. The battery pack according to claim 6, wherein
one end of each of the multiple connection wires of the harness is mounted on a corresponding bus bar of the multiple bus bars, to connect to the battery cell anode and/or the battery cell cathode on a corresponding battery cell; and
the other end of each of the multiple connection wires of the harness is connected to the control circuit, so that each battery cell anode and each battery cell cathode of the multiple battery cells are connected to the control circuit to enable the control circuit to monitor a working state of each of the battery cells.

8. The battery pack according to claim 6, further comprising:
a first metal wiring terminal and a second metal wiring terminal, wherein the first and the second metal wiring terminals are connected to the positive output end and the negative output end of the multiple battery cells connected in series, respectively;
a first step and a second step are disposed at two end portions of one of the length side walls; and
the first metal wiring terminal and the second metal wiring terminal are disposed on the first step and the second step, respectively.

9. The battery pack according to claim 8, wherein the first step and the second step are disposed in positions close to an upper portion opening on the one of the length side walls.

10. The battery pack according to claim 8, wherein at respective junctions of the two end portions of the one of the length side walls with the first width side wall and the second width side wall, the one of the length side walls is bent at the two end portions thereof towards the other length side wall, and the two end portions of the first width side wall and the second width side wall close to the one of the length side walls are bent towards each other respectively, so as to form the first step and the second step at the two junctions of the end portion of the one of the length side walls with the first width side wall and the second width side wall.

11. The battery pack according to claim 8, herein:
a material for bearing the first metal wiring terminal and the second metal wiring terminal is a first plastic material; and
other parts of the housing are made of a second plastic material, or most of other parts of the housing are made of the second plastic material.

12. The battery pack according to claim 11, wherein:
the first plastic material and the second plastic material have different characteristics;
the first plastic material has desirable insulation and corrosion resistance; and
the second plastic material has desirable mechanical performance.

13. The battery pack according to claim 12, wherein:
the first plastic material is polyphthalamide, and
the second plastic material is Nylon 66.

14. The battery pack according to claim 13, further comprising:
a first metal sheet and a second metal sheet, wherein the first metal wiring terminal and the second metal wiring terminal are disposed at a first end of the first metal sheet and a first end of the second metal sheet, respectively; and
a first leading-out terminal and a second leading-out terminal, wherein the first leading-out terminal and the second leading-out terminal are disposed at a second end of the first metal sheet and a second end of the second metal sheet respectively, so that the first metal wiring terminal and the second metal wiring terminal are electrically conducted to the first leading-out terminal and the second leading-out terminal respectively, wherein
the first leading-out terminal and the second leading-out terminal are connected to the positive output ends and the negative output ends of the multiple battery cells connected in series, respectively.

15. The battery pack according to claim 14, further comprising:
a first plastic substrate and a second plastic substrate-that are made of the first plastic material, wherein
before the housing is molded, the first metal sheet and the second metal sheet-are prefabricated;
before the housing is molded, the first metal sheet and the second metal sheet are insert-molded in the plastic substrates made of the first plastic material; and
when the housing is molded by using the second plastic material, the first and the second plastic substrates are insert-molded at the first step and the second step on the housing respectively.

16. The battery pack according to claim 14, wherein:
the first ends of the first metal sheet and the second metal sheet are disposed outside the housing; and
the second ends of the first metal sheet and the second metal sheet are disposed in the housing.

17. The battery pack according to claim 1, wherein the first end plate and the second end plate are made of plastic materials to absorb expansion deformations of the multiple battery cells while expanding and deforming.

18. The battery pack according to claim 17, wherein:
front faces of the first end plate and the second end plate are in contact with outermost two battery cells of the continuously arranged multiple battery cells respectively, so as to fix the continuously arranged multiple battery cells in a horizontal direction; and
a circuit board and/or an electronic component is mounted on reverse faces of the first end plate and the second endplate.

19. The battery pack according to claim 18, wherein:
a control circuit is disposed on the circuit board,
the electronic component comprises a relay;
the circuit board is mounted on the reverse face of the first end plate; and
the relay is mounted on the reverse face of the second end plate.

20. A battery module including:
a housing, the housing including:
opposing first and second width side walls;
opposing first and second opposing length side walls; and
at least one end plate;
a plurality of battery cells having top portions and forming a battery top portion through-slot;
a bearing plate having a bottom portion provided with, a bearing plate bottom portion through-slot, and when the bearing plate is mounted at the top portions of the plurality of battery cells, the bearing plate bottom portion through-slot is press-fitted with the battery top portion through-slot to form a lateral gas discharging passage, wherein the lateral gas discharging passage has an outlet, and a distal end of the lateral gas discharging passage is sealed by a blocking plate;
a vertical gas discharging passage disposed on an inner side of the first width side wall, wherein the vertical gas discharging passage is in fluid communication with the lateral gas discharging passage; and
a ventilation guide slot positioned in an upper end of the at least one end plate, wherein the ventilation guide slot is located between the lateral gas discharging passage and the vertical gas discharging passage to enable the lateral gas discharging passage to be in fluid communication with the vertical gas discharging passage.

21. The battery module according to claim 20, wherein the housing further includes a bottom portion and a top portion.

22. The battery module according to claim 21, wherein the top portion of the housing is a removable cover.

23. The battery module according to claim 21, wherein the bottom portion is provided with a heat dissipation apparatus, wherein the heat dissipation apparatus is provided with an air passage, and the air passage has an inlet and an outlet.

24. The battery module according to claim 23, wherein the heat dissipation apparatus is provided with a heat dissipation pad, and two sides of the heat dissipation pad are in contact with the bottom portions of the plurality of battery cells and an upper portion of the air passage respectively.

25. The battery module according to claim 20, further comprising:
a circuit board, wherein a control circuit is mounted on the circuit board: and
a harness, wherein the harness is mounted on the bearing plate, and the harness comprises multiple connection wires to connect each of the plurality of battery cells to the control circuit.

26. The battery module according to claim 20, further comprising a gas discharging port on the first width side wall to provide an outlet for the vertical gas discharging passage.

* * * * *